US012772023B2

(12) United States Patent
Khoryaev et al.

(10) Patent No.: US 12,772,023 B2
(45) **Date of Patent: *Oct. 20, 2026**

(54) MEASUREMENT AND PROCEDURES FOR NR POSITIONING

(71) Applicant: APPLE INC., Cupertino, CA (US)

(72) Inventors: Alexey Khoryaev, Nizhny Novgorod (RU); Sergey Sosnin, Zavolshie (RU); Mikhail Shilov, Nizhny Novgorod (RU); Sergey Panteleev, Nizhny Novgorod (RU); Seunghee Han, San Jose, CA (US)

(73) Assignee: APPLE INC., Cupertino, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/654,725

(22) Filed: May 3, 2024

(65) Prior Publication Data

US 2024/0314519 A1 Sep. 19, 2024

Related U.S. Application Data

(63) Continuation of application No. 17/310,934, filed as application No. PCT/US2020/026248 on Apr. 1, 2020, now Pat. No. 11,979,794.

(Continued)

(51) Int. Cl.

| | |
|---|---|
| ***H04W 4/029*** | (2018.01) |
| ***G01S 5/10*** | (2006.01) |
| ***G01S 13/87*** | (2006.01) |
| ***H04L 5/00*** | (2006.01) |
| ***H04W 24/10*** | (2009.01) |

(52) U.S. Cl.

CPC ............... *H04W 4/029* (2018.02); *G01S 5/10* (2013.01); *G01S 13/876* (2013.01); *H04L 5/005* (2013.01); *H04W 24/10* (2013.01)

(58) Field of Classification Search

CPC ..... H04W 4/029; H04W 24/10; H04W 64/00; G01S 5/10; G01S 13/876; G01S 5/0036;

(Continued)

(56) References Cited

U.S. PATENT DOCUMENTS 10,548,181 B2 1/2020 Siomina et al.
11,979,794 B2 * 5/2024 Khoryaev ............. H04W 24/10

(Continued)

FOREIGN PATENT DOCUMENTS

CN 106664591 A 5/2017
CN 107925496 A 4/2018
CN 108702275 A 10/2018

OTHER PUBLICATIONS

U.S. Appl. No. 17/310,934, Notice of Allowance, Feb. 28, 2024, 5 pages.

(Continued)

*Primary Examiner* — Don N Vo
(74) *Attorney, Agent, or Firm* — Dorsey & Whitney LLP

(57) ABSTRACT

User equipment (UE) positioning within a 5G New Radio (NR) network may be determined by receiving a downlink (DL) position reference signal (PRS) resource set indicating a plurality of DL PRS resources and receiving a DL PRS report configuration that indicates a set of measurements to be performed by a UE for each of the plurality of DL PRS resources within the DL PRS resource set. Position measurements may be performed for each of the plurality of DL PRS resources within the DL PRS resource set, including generating a reference signal time difference (RSTD) measurement by estimating a timing of a first arrival path from at least two of the plurality of DL PRS resources and determining a reference signal received power (RSRP) metric or a signal to noise and interference ratio (SINR) metric (Continued)

associated with the at least two DL PRS resources. The performed position measurements may be reported.

20 Claims, 11 Drawing Sheets

Related U.S. Application Data

(60) Provisional application No. 62/827,753, filed on Apr. 1, 2019.

(58) Field of Classification Search
CPC ....... G01S 5/0236; H04L 5/005; H04L 5/006; H04L 5/0091; H04L 5/0023; H04L 27/261
USPC ........................................................ 455/456.1
See application file for complete search history.

(56) References Cited

U.S. PATENT DOCUMENTS

| | | | | |
|---|---|---|---|---|
| 2017/0171857 | A1 | 6/2017 | Lee et al. | |
| 2017/0238298 | A1 | 8/2017 | Wang et al. | |
| 2018/0270784 | A1 | 9/2018 | Lee et al. | |
| 2020/0396772 | A1* | 12/2020 | Tirronen | H04W 4/70 |
| 2022/0183055 | A1 | 6/2022 | Rune et al. | |

OTHER PUBLICATIONS

U.S. Appl. No. 17/310,934, Non-Final Office Action, Oct. 31, 2023, 11 pages.
Intel Corporation, "Design Aspects for NR DL and UL Positioning", R1-1902513, 3GPP TSG RAN WG1 Meeting #96, Athens, Greece, Agenda Item 7.2.10.1.3, Feb. 25-Mar. 1, 2019, 9 pages.
Intel Corporation, "NR Positioning Evaluation Results", R1-1902514, 3GPP TSG RAN WG1 Meeting #96, Athens, Greece, Agenda Item 7.2.10.1.4, Feb. 25-Mar. 1, 2019, 21 pages.
Intel Corporation, "UE and gNB Measurements for NR Positioning", R1-1904321, 3GPP TSG RAN WG1 Meeting #96bis, Xi'an, China, Agenda Item 7.2.10.2, Apr. 8-12, 2019, 9 pages.
LG Electronics, "Discussions on DL only based Positioning", R1-1900629, 3GPP TSG RAN WG1 Ad-Hoc Meeting 1901, Taipei, Taiwan, Jan. 21-25, 2019, 9 pages.
PCT/US2020/026248, International Search Report and Written Opinion, Jun. 18, 2020, 30 pages.

* cited by examiner

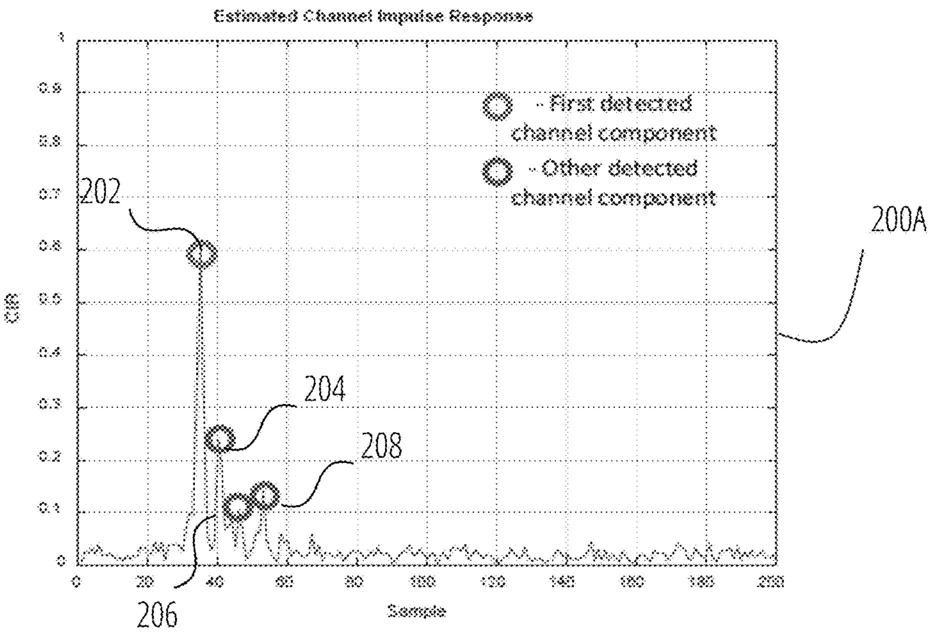
FIG. 2A
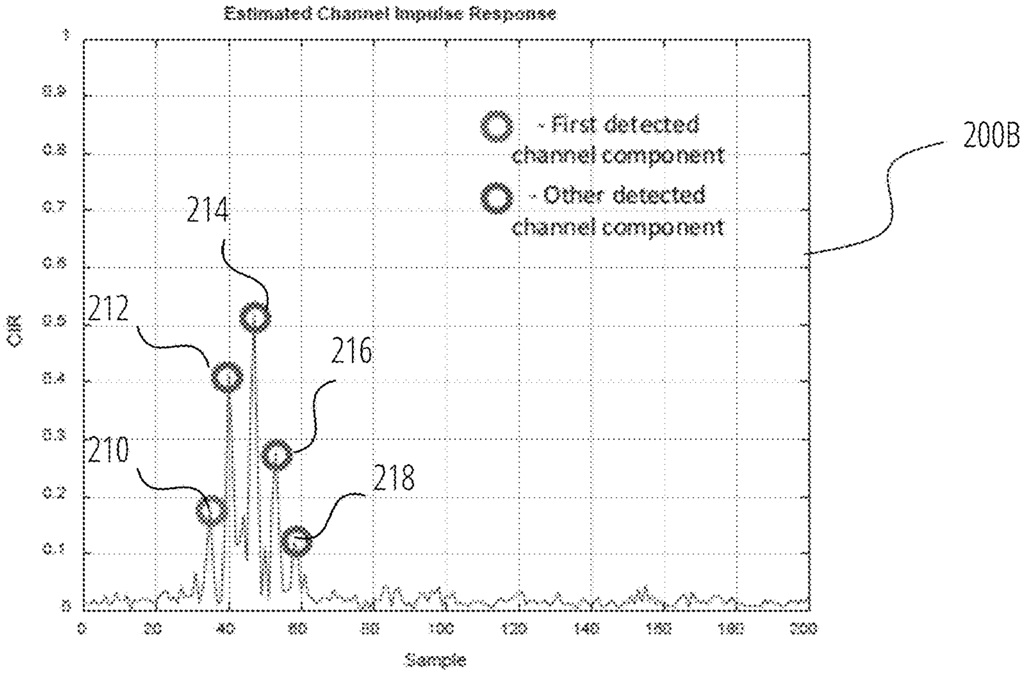
FIG. 2B
FIG. 2

MEASUREMENT AND PROCEDURES FOR NR POSITIONING

CROSS-REFERENCE TO RELATED APPLICATION(S)

This application is a continuation of U.S. patent application Ser. No. 17/310,934, filed Aug. 31, 2021, which is a national stage application filed under 35 U.S.C. § 371 of International Patent Application No. PCT/US2020/026248, filed Apr. 1, 2020, which claims the benefit of U.S. Provisional Application No. 62/827,753 filed Apr. 1, 2019, each of which is hereby incorporated by reference herein in its entirety.

TECHNICAL FIELD

This application relates generally to wireless communication systems, and more specifically to positioning of user equipment (UE) within a 5G New Radio (NR) network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 2A and 2B illustrate representations in accordance with one embodiment.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

A report structure for positioning measurements in 5G New Radio (NR) systems and the principles of report granularity configuration for both user equipment (UE) and gNodeB (gNB) nodes are discussed herein. Additionally, three new measurement concepts that are capable of improving the efficiency of NR positioning operation are discussed. The first measurement concept is a measurement of so called soft LOS metric which characterizes the estimated channel and provides information about the channel flatness. The second measurement concept is based on measurement of inter gNB synchronization error in the system and compensation of that error on the network side or on the UE side. The third measurement concept relates to synchronization error measurement between a UE and a gNB. This compensation approach provides an opportunity to synchronize UEs and gNBs in the system and obtain time of arrival (TOA) measurements instead of reference signal time difference (RSTD) measurements. Further in this disclosure, the concepts of cell-centric and UE-centric downlink (DL) positioning reference signal (PRS) configuration, which provides a mechanism for DL PRS optimization of a specific UE or a group of UEs, are described. Finally, the details of UE TA behavior, power control procedure for UL PRS (Sounding Reference Signal (SRS)) transmission and association of DL/uplink (UL) PRS transmissions are provided. Accordingly, the present disclosure provides a report structure configuration for NR positioning systems that improves the efficiency of positioning services in NR communication systems and provides the flexibility to positioning reference signal configuration in NR communication systems.

1. UE Measurements for NR Positioning 1.1. UE Measurement Report Structure

Figure 1:
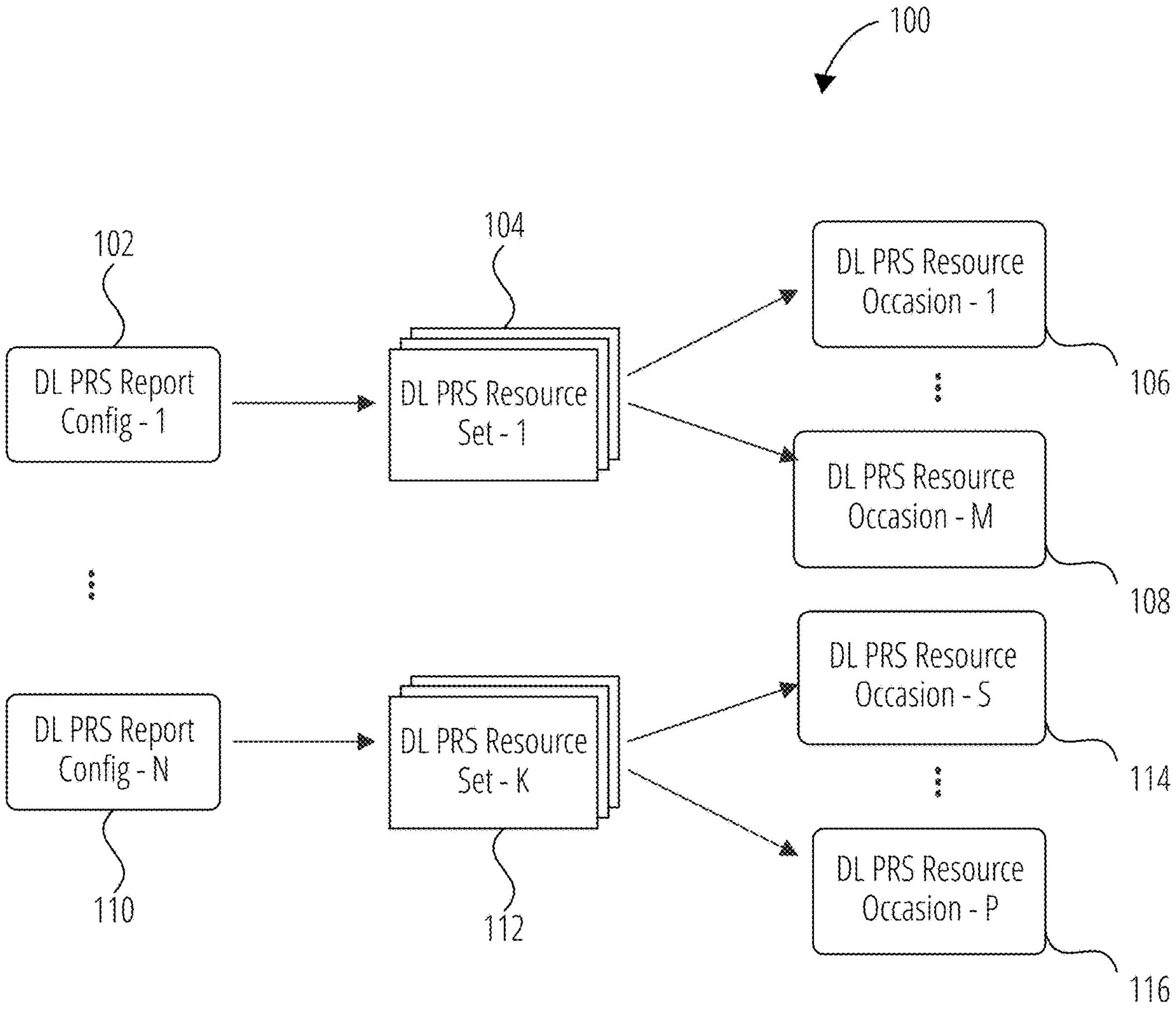
FIG. 1 illustrates an item in accordance with one embodiment.

FIG. 1 illustrates the association between DL PRS report configurations and DL PRS resources/DL PRS resource sets. As shown, FIG. 1 includes DL PRS Report Config-1 102, which is associated with DL PRS Resource Set-1 104. The DL PRS Resource Set-1 104 includes a number of DL PRS resources as shown by DL PRS Resource Occasion-1 106 through DL PRS Resource Occasion-M 108. In addition, DL PRS FIG. 2 Report Config-N 110 illustrates the principles described herein may be utilized with any number of DL PRS report configurations and any number of associated DL PRS resource sets (i.e., as illustrated by DL PRS Resource Set-K 112) and any number of DL PRS resources (i.e., as illustrated by DL PRS Resource Occasion-S 114 through DL PRS Resource Occasion-P 116). For NR positioning, a UE performs measurements for DL PRS resources within a DL PRS resources set that are configured for UE measurements and reporting. Configuration of DL PRS resource sets and DL PRS reports are independent signaling. The UE is expected to follow DL PRS Report configuration for UE DL measurements.

NR supports DL PRS report configuration information signaled to the UE by higher layers. The DL PRS report is configured independently from DL PRS resource sets and indicates a set of measurements to be conducted by the UE for indicated DL PRS resource sets IDs or DL PRS resource IDs.

The open question is how to perform and report UE measurements to the network/location server. One or a combination of the alternatives discussed below may be used as a reporting method.

In some embodiments, a single measurement is reported by the UE per DL PRS resource set. In such embodiments, the following options may be utilized: Option 1. The DL PRS resource for measurements is indicated by higher layer signaling from the network side (e.g., the UE is configured with a dedicated DL PRS resource Id for measurements); Option 2. The DL PRS resource for measurements is selected by the UE (e.g., the resource for reference signal time difference (RSTD) measurement is selected based on pre-configured criteria-one or more of the following options may be utilized as a selection criteria: measurement with best PRS SNR/RSRP/RSRQ value; measurement with the best estimation accuracy; and/or measurement with the best soft LOS metric as further described below); Option 3. A single measurement is reported based on processing of all DL PRS resources within a DL PRS resource set (e.g., post-processing of measurement results for each DL PRS resource (e.g. averaging of timing estimate, etc.)). Notably, the following formula can be used for propagation delay measurement selection: Propagation delay {mint propagation delay from $i_{th}$ DL PRS Resource}

In other embodiments, multiple measurements are reported by the UE per DL PRS resource set (e.g., report of M measurements). In such embodiments, the following options may be utilized: Option 1. The UE is configured to perform measurements and provide a report for M Resources within a DL PRS resource set, where M is configured for each PRS resource set; Option 2. The UE is configured to select M resource for measurements and provide a report within DL PRS resource set, where M is configured for each PRS resource set and its max value is limited by the size of the DL PRS resource set; Option 3. The UE is configured to perform a set of measurements selected by pre-configured criteria. One or a combination of the following options may be utilized as a selection criteria: measurement with a PRS SNR/RSRP/RSRQ value above a predefined threshold and/or a measurement with a soft LOS metric value above a predefined threshold.

1.2 UE Reporting Behavior

Based on the discussion above, there may be a question as to whether the UE should have any degree of freedom to select DL PRS resources for measurements and report (e.g., the UE selecting the best M resources for report) or whether resources for measurements should be configured by the network directly. For network based positioning solutions, it may be beneficial for all measurements done by the UE to be directly requested by the network and to be performed in accordance with the configuration provided by network. The network may request the UE to provide some assistance information in order to configure the UE with proper resources for measurements that will be reported to the network.

In the case of network assisted UE-based positioning, the network may request the UE to provide an estimate of the UE location using measurements from DL PRS resources provided by the network (e.g., DL PRS resources IDs). Such can be considered as assistance information (e.g., recommended resources so that the UE does not need to select DL PRS resources on its own). This assistance information may be provided by the network even without requesting an estimate of the UE location and may be simply signaled as a list of DL PRS resource IDs recommended for measurements.

In the case of autonomous UE-based positioning, the UE does not expect the network to provide information on DL PRS resources for measurements and selects corresponding resources autonomously based on signaled DL PRS resource sets broadcasted to all UEs.

1.3 Reference Resource ID selection for DL PRS DL Timing Based Measurements

A DL RSTD measurement requires defining the reference DL PRS resource that is associated with reference TRP/cell. The reference DL PRS resource ID can be provided to the UE by the network as a part of assistance information or selected by the UE. Thus, one or a combination of reference resource ID selection is used for DL-TDOA and RTT measurements: DL PRS reference resource ID is provided by the network using higher layer signaling (e.g., as a part of DL PRS report configuration) or If DL PRS reference resource ID is not provided by the network, it is selected by the UE and indicated to the network as a part of UE reporting.

1.4 Measurement and Report of K-factor for Detected Channel Component

For RSTD measurements, a UE needs to estimate a timing of the first arrival path from two DL PRS Resources (i.e., target and reference resource). The quality of a given RSTD measurement will be dominated by the DL PRS resource with lower RSRP or SINR metrics. In other words, a given RSTD measurement may be given more weight when the associated DL PRS resource has a low RSRP or SINR metric in comparison to other DL PRS resources. Therefore, the knowledge of these metrics may be utilized in addition to the RSTD measurement itself. With respect to RSTD, the DL PRS-RSRP measurement can be introduced in following ways: Option 1: RSRP from all multi-path components (RSRP); or Option 2: RSRP of the first arrival path component ($RSRP_{FAP}$).

The following ratios may be used as an estimation of K-Factor (or measure of frequency selectivity): $RSRP_{FAP}$/RSRP; ($RSRP_{FAP}$/(RSRP−$RSRP_{FAP}$)).

The high values of K-Factor may be good indicators of the LOS type of propagation. The information about LOS propagation conditions may be useful for UE positioning and therefore can be considered as a candidate for NR positioning.

FIGS. 2A and 2B illustrate low and high K-factor as a ratio of first detected channel component power to powers of all other detected channel components. In other words, FIGS. 2A and 2B illustrate the cases with K-factors variation for different estimated channel instances. As shown, FIG. 2A includes a first detected channel component 202, as well as other detected channel components 204 through 208. Similarly, FIG. 2B, includes a first detected channel component item 210, as well as other detected channel components 212 through 218.

For NR positioning techniques based on DL timing estimation, the soft LOS metric describing the ratio of detected first channel component to all other detected channel components is supported for DL PRS measurement report. A gNB can also estimate the soft LOS metric according to the same principle.

1.5 Intra gNB Synchronization Error Measurement

An additional UE measurement that can be used to support RTT based positioning with multiple cells is UE Tx-Rx time difference. In order to obtain such measurements at the UE side for multiple cells, the following options can be considered: Option 1. Ranging (RTT estimation) with serving (or reference) cell/TRP and RSTD measurements for neighboring cells/TRPs relative to serving (or reference) cell/TRP (this option has benefits in terms of coverage given that the majority of measurements are done for DL PRS that are supposed to have significantly large coverage than UL SRS (PRS) due to UE and gNB TX power difference. The drawback of this option is that it requires accurate network synchronization or knowledge of the synchronization error (TX timing offset between cells/TRPs) at the UE side. This TX timing offset can be either provided by the network or directly compensated at gNB side considering that it is known (e.g., can be measured by gNBs)); or Option 2. Ranging (RTT estimation) with multiple cells/TRPs (the main drawback of this option is that it requires timing measurements from each UE across multiple cells/TRPs that may become a bottleneck for UL SRS (PRS) processing in terms of link budget. In addition, from a UL overhead and spectrum efficiency perspective this option has much lower scaling capability in terms of capacity of positioned users. If RTT measurements are available jointly with gNB TX-RX time difference measurements, the inter-cell timing synchronization error can be estimated (either at the UE side (scc FIG. 3) or gNB side depending on the protocol) and compensated. Accordingly, FIG. 3 illustrates an example of measuring inter-cell time synchronization offset at the UE side.

For RTT based positioning, the following two methods are supported by NR: Method 1. Ranging with serving (or reference) cell/TRP for RTT estimation and RSTD measurements with respect to serving (or reference) cell/TRP (this procedure assumes that the network is either synchronized (e.g., transmit timing offset among TRPs/gNBs is zero) or TRP's/gNB's timing offsets with respect to serving (or reference) cell/TRP are indicated by the network); Method 2: Ranging with multiple cells/TRPs (including serving/reference and neighbor cells/TRPs) (this procedure assumes that the network measures a gNB TX-RX time difference for UEs in serving and neighboring cells; measured gNB TX-RX time differences are reported to UEs or LMF)

1.6 UE-gNB Synchronization Measurement and Compensation

Figure 3:
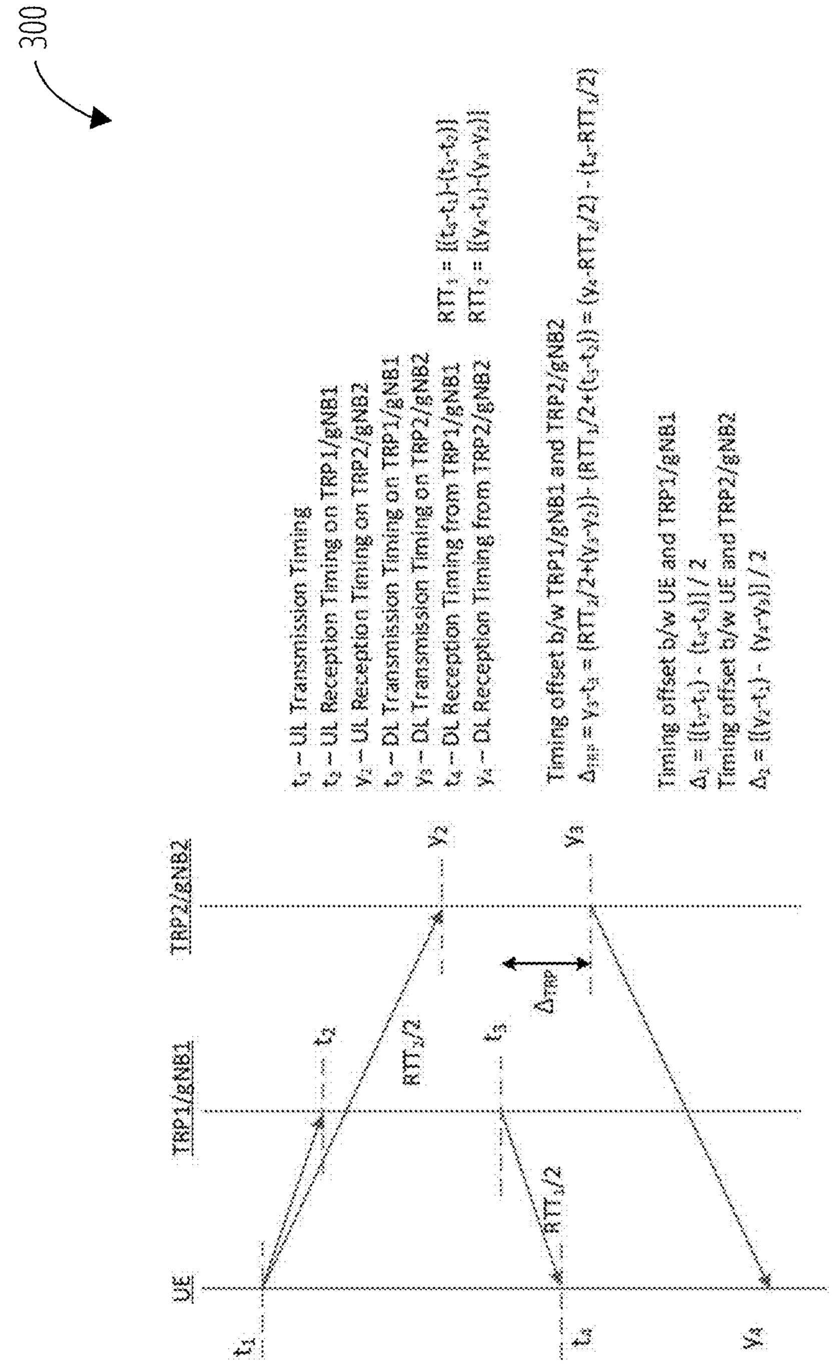
FIG. 3 illustrates a representative timeline in accordance with one embodiment.

As illustrated in FIG. 3, during an RTT procedure, assuming the knowledge of time instances t1-4, it is possible to estimate the synchronization offset Δi between a UE and a gNB time windows. From the knowledge of Δi, it is possible to obtain TOA measurements between UE and a gNBi, assuming that the estimated synchronization is relatively accurate.

To support the UE-base synchronization error estimation, it is required from gNB to signalize the time instances t2 and t3 to a UE during the RTT measurement procedure. The synchronization error has a tendency to vary in time because of sampling time clock drift on UE and gNB sides, but depending on the clock accuracies there is still a time interval of quasi-stationary time synchronization, where the estimated error will be applicable.

The period of quasi-stationary time synchronization-TQS depends on UE and gNB capabilities and can be defined in a UE-gNB specific manner or single value for the all network. The period of time which is required for the RTT measurement procedure between a UE and a gNB, during which the synchronization error between current UE and the gNB is estimated-TQS_RTT and is defined in part of the TQS_RTT. The period of time TQS_TOA which is defined for TOA measurement procedure between a UE and a gNB, during which the synchronization error between current UE and the gNB is assumed to be constant. The value of TQS_TOA is calculated according to the formula: TQS_TOA=TQS-TQS_RTT.

Figure 4:
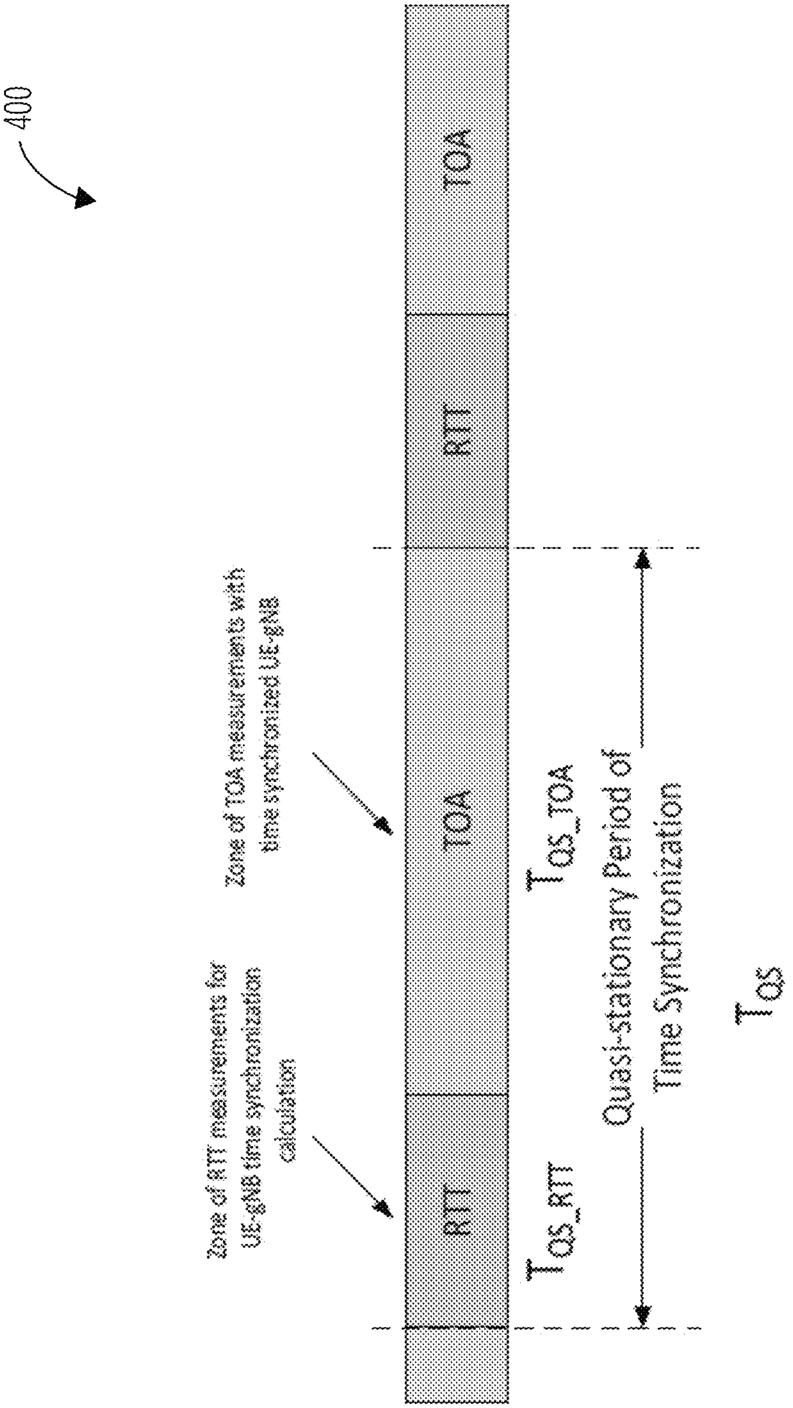
FIG. 4 illustrates a representative timeline in accordance with one embodiment.

The principles described herein help to improve DL-only positioning performance. For instance, FIG. 4 illustrates the system time periods configuration: TQS and TQS_RTT. During TQS_RTT period a UE and a set of gNBs will operate in RTT measurement mode, and the reaming time period TQS-TQS_RTT, synchronized UE-gNBs can operate in TOA mode.

1.7. DL PRS Measurements for NR DL-AoD Based Positioning

If DL PRS RSRPFAP is defined, it may be possible to estimate DL-AoD based on either traditional DL-PRS RSRP or DL PRS RSRPFAP criteria (e.g., Resource ID with max DL PRS-RSRP or max DL PRS-RSRPFAP) can be reported. In addition, a UE may be able to report measurements using both criteria. In this case, two hypothesis can be analyzed at the network side. In the case of LOS propagation condition both criteria are likely to produce the same results, which may further increase confidence of LOS radio-conditions together with K-Factor measurements.

1.8. UE Capability Consideration

UE DL PRS resource processing may generally be limited. For instance, a UE may have a restriction on the maximum number of DL PRS resources and DL PRS resource sets that may be configured. In addition, the number of measurements and reports can also be limited, including values of processing delays. For network based positioning solutions, a UE is expected to be configured with the DL PRS report configurations that are aligned with the UE's capabilities. One or a combination of following options may be used for positioning capability signaling by a UE: fixed UE type set with different positioning capabilities; UE signalize positioning capability in terms of DL PRS resources which it is capable to proceeded, assuming that positioning BWP in the system is known on the UE side; UE signalize positioning capability by maximum number of DL PRS resource which is capable to be proceeded, assuming predefined positioning BWP configuration; number of DL PRS resources supported by the UE for measurements is function of DL PRS Resource bandwidth.

2. GNB Measurements for NR Positioning 2.1. GNB Reporting

The following two types of gNB reporting may be considered: gNB shares measurements to network (LMF/location server) (in general, the corresponding signaling for this type of reporting can be developed by RAN2, however RAN1 may need to work and decide on parameters to be included into that signaling); gNB shares measurements results to UEs (either directly or through LMF/location server) (signaling details for sharing gNB measurements results to UEs can be discussed in RAN2 WG, however, RAN1 may provide recommendations on parameters and measurements to be shared).

3. DL PRS Configuration

In order to process DL PRS signals for NR Positioning DL measurements, a UE is expected to be configured with DL PRS resource sets carrying information on DL PRS resources and additionally DL PRS report configuration.

The list of DL PRS resource sets may provide full information on DL PRS transmission schedule to a UE, so that the UE is aware on which resources which signal is transmitted. Each DL PRS resource is associated with a geographical coordinate of transmission reception point and angular information (beam transmission direction).

The DL PRS may be used for DL reception timing estimation, RSTD, RSRP, SINR, UE TX-RX time difference measurements. For a DL PRS resource associated with a DL PRS resource set. For NR positioning (especially for operation in FR2), two types of DL PRS resource allocation may be utilized depending on the use case and scenario.

The first type of DL PRS resource allocation is referred to herein as cell-centric DL PRS resource allocation. The cell-centric DL PRS resource allocation targets support of all UEs interested in positioning services and is not optimized in terms of DL signaling and PRS allocation towards any specific UE. Instead, cell-centric DL PRS resource allocation targets to serve all UEs in the cell and may have more DL PRS resources configured in comparison to the second type of DL PRS resource allocation (i.e., UE centric). For Cell-Centric DL PRS resource allocation, the UE may process configured DL PRS resources and provide a feedback report aiming to construct UE centric DL PRS resource allocation.

The second type of DL PRS resource allocation is referred to herein as UE Centric DL PRS resource allocation. UE centric DL PRS resource allocation assumes that a UE has provided feedback to the network based on processing of cell-centric DL PRS resources or Rel-15 legacy signals such as SSB or CSI-RS for BM. The UE feedback may be used to construct UE centric DL PRS resource configuration. This type of operation may be beneficial to reduce UE processing complexity and measurement delay given that only a subset of resources may be configured and monitored by the UE.

Another possible option to operate NR positioning is to use cell-centric DL PRS resource allocation and configure the UE with a UE centric DL PRS measurement report that will request measurements on a subset of cell-centric DL PRS resources.

3.1. UE Assistance Information for UE Centric Resources or Measurement Report Configuration For Construction of UE Centric DL PRS resource allocation or DL PRS measurement report (DPMR), a UE may provide the following information to the network/location server: Cell ID; SSB index (e.g. corresponding to max SS-RSRP value); CSI-RS Resource ID (e.g., corresponding to max L1-RSRP value); UE location information (e.g., if UE has a-priori knowledge of it coordinates); UE TX-RX Measurement based on Rel.15 reference signals; Recommended DL PRS Resources (Resource IDs) based on processing of Cell Centric DL PRS Resources.

4. DL PRS Processing

In FR2, DL PRS processing may support gNB TX and UE RX beam sweeping. For each DL TX beam, a UE, if it is capable, may adjust RX beam and apply it for reception, otherwise the UE may use fixed RX beam. During RX processing, a UE may select RX beam for each DL PRS resource in all configured DL PRS resource sets. One or a combination of following rules may be applied for DL PRS transmission/reception: UE apply RX beam-sweeping for given DL PRS Resource processing only if DL TX beam sweeping is off on a given DL PRS resource, which should be signaled as a part of DL PRS resource attribute; UE RX beam-sweeping procedures during DL PRS reception are left up to UE implementation (e.g., procedures whether and how to select UE RX beam for DL PRS reception are not specified); RAN1 assumes that for each DL PRS Resource, a UE may select different RX beam and establish association between DL PRS Resources and UE RX beams (e.g., association of DL PRS resources with UE RX beams is up to UE implementation).

5. DL PRS and UL SRS Transmission

The support of RTT positioning may utilize transmission of reference signals and measurements in DL and UL. Transmission of DL reference signal may be also beneficial and utilized for UL-TDOA, if configured.

As discussed herein, for operation in Mode-2, it is assumed that a UE may conduct measurements across DL PRS resources of different DL PRS resource sets and associate its RX beams with each configured DL PRS resource. In this case, if the UE supports beam correspondence, it may apply RX beam for UL transmission. This UE behavior may be beneficial at least from link budget perspective. In order to support such operation from specification perspective, the DL PRS and UL SRS (PRS) resources can be associated with each other.

6. TA Procedure for UL-TDOA and RTT

The UE TA behavior for UL-TDOA and RTT includes the following options: Option 1: the UE applies the same timing advance for all UL SRS(PRS) Resources across all UL SRS(PRS) Resource Sets as for serving cell (reference); Option 2: the UE applies the timing advance corresponding to one of the neighboring cells for all UL SRS(PRS) resources across all UL SRS(PRS) resource sets; Option 3: UE applies individual timing advance for all UL SRS(PRS) resources across all UL SRS(PRS) resource sets; Option 4: UE applies common timing offset for transmission on all UL SRS(PRS) resources across all UL SRS(PRS) Resource sets. The value of common timing offset is indicated by gNB independently of timing advance. The common timing offset is defined either with respect to DL reception timing or DL reception timing and timing advance.

7. Power Control Procedure for UL-TDOA and RTT

With respect to power control for UL SRS (PRS) transmission, it should be noted that UL SRS resource set configuration contains reference to DL RS to be used for pathloss estimation and finally OL PC settings controlled by P0 and $\alpha$ power control parameters. The following options may be considered for UL SRS (PRS) power control: Option 1: UL SRS power control behavior is reused for NR positioning; Option 2: UL SRS resource set refers to DL RS resource (e.g., DL PRS, CSI-RS) in neighboring cell for pathloss estimation; and Option 3: UL SRS resource set is configured with pathloss value to be used for open loop power control.

Figure 5:
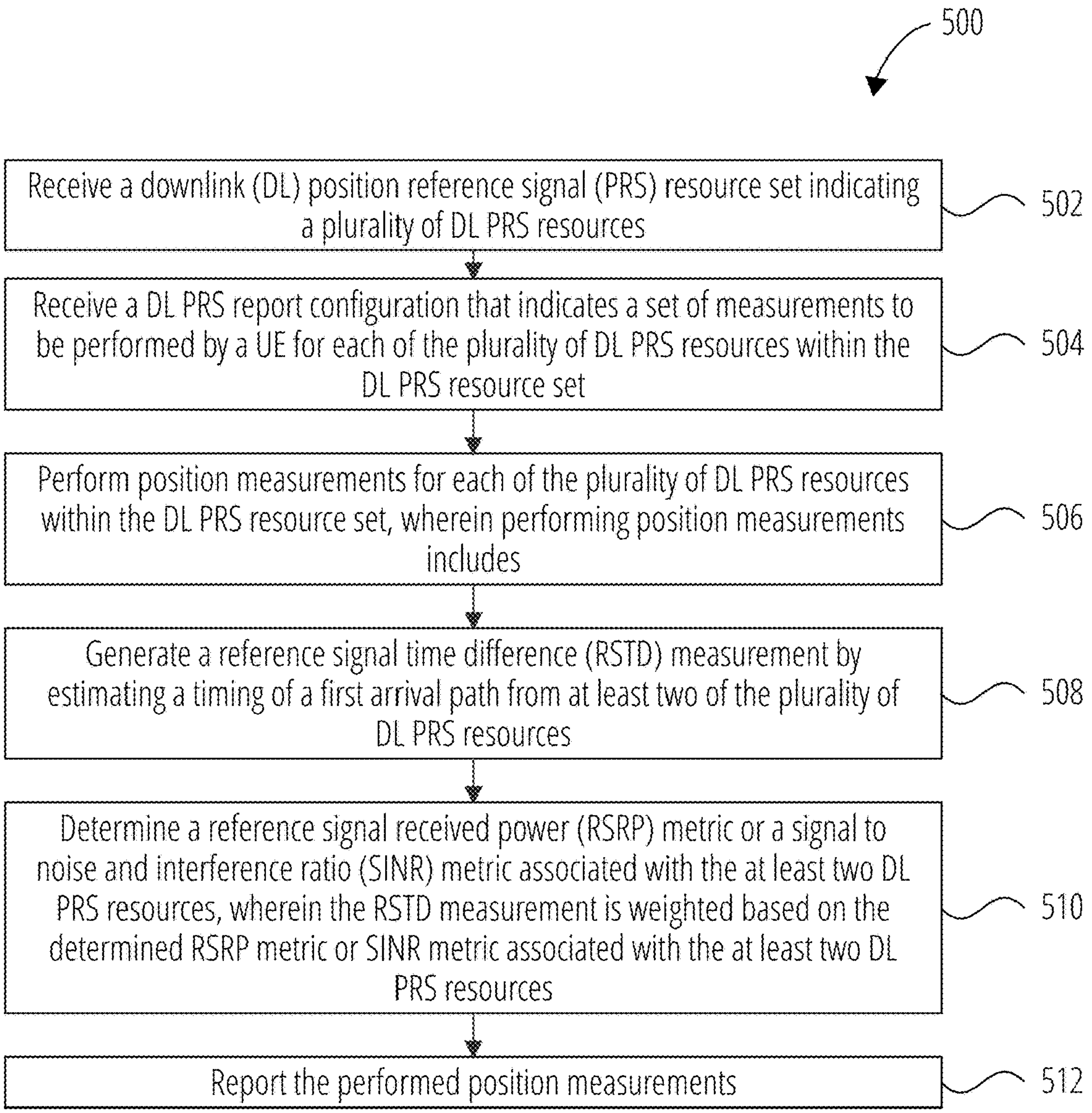
FIG. 5 illustrates a method in accordance with one embodiment.

FIG. 5 illustrates a flowchart of a method 500 for determining user equipment (UE) positioning within a 5G New Radio (NR) network In block 502, the method 500 receives a downlink (DL) position reference signal (PRS) resource set indicating a plurality of DL PRS resources. In block 504, the method 500 receives a DL PRS report configuration that indicates a set of measurements to be performed by a UE for each of the plurality of DL PRS resources within the DL PRS resource set. In block 506, the method 500 performs position measurements for each of the plurality of DL PRS resources within the DL PRS resource set, wherein performing position measurements includes. In block 508, the method 500 generates a reference signal time difference (RSTD) measurement by estimating a timing of a first arrival path from at least two of the plurality of DL PRS resources. In block 510, the method 500 determines a reference signal received power (RSRP) metric or a signal to noise and interference ratio (SINR) metric associated with the at least two DL PRS resources, wherein the RSTD measurement is weighted based on the determined RSRP metric or SINR metric associated with the at least two DL PRS resources. In block 512, the method 500 reports the performed position measurements.

Figure 6:
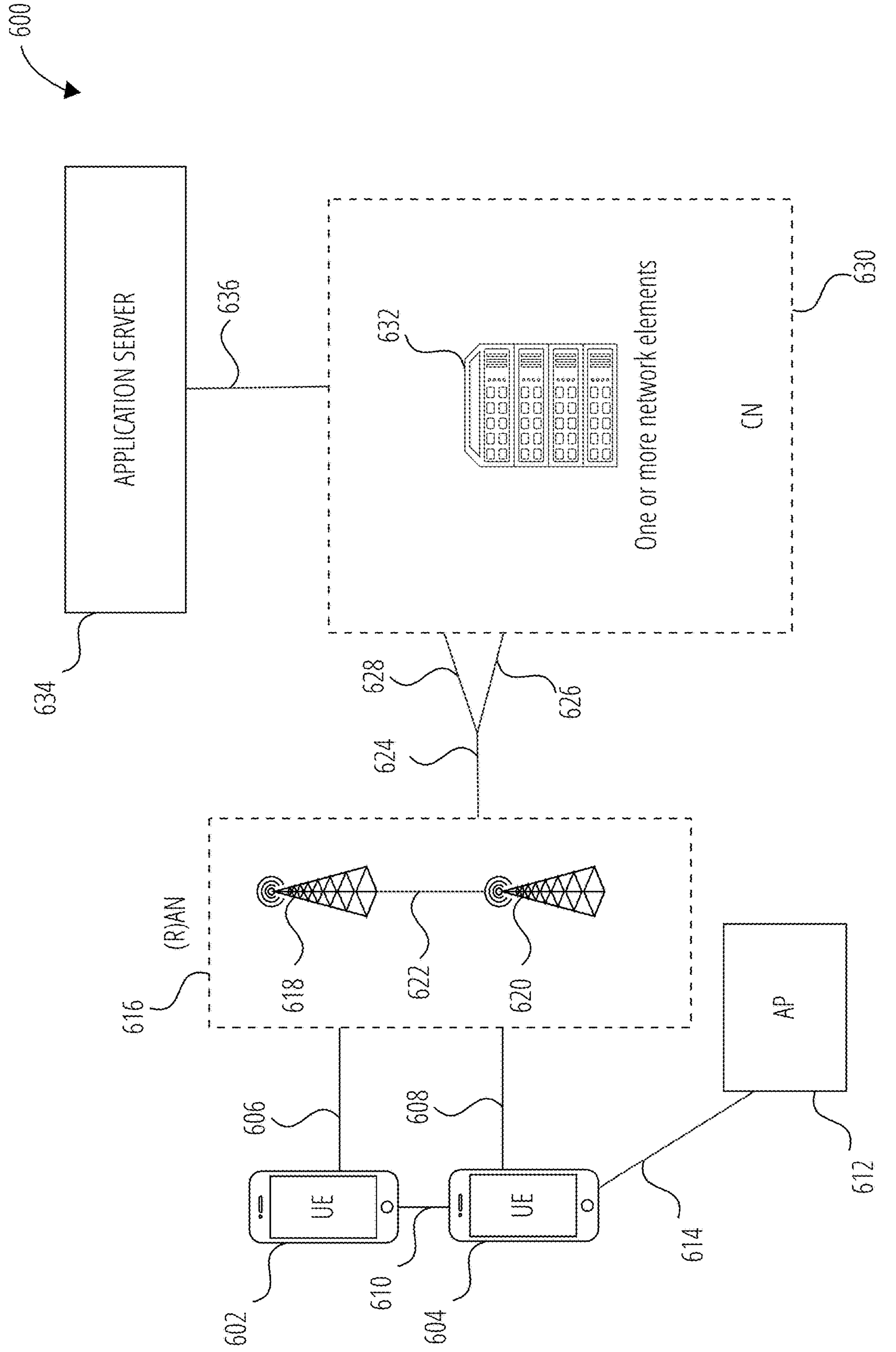
FIG. 6 illustrates a system in accordance with one embodiment.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 602 and UE 604. In this example, the UE 602 and the UE 604 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 602 and/or the UE 604 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 602 and UE 604 may be configured to connect, for example, communicatively couple, with an access node or radio access node (shown as (R)AN 616). In embodiments, the (R)AN 616 may be an NG RAN or a SG RAN, an E-UTRAN, or a legacy RAN, such as a UTRAN or GERAN. As used herein, the term "NG RAN" or the like may refer to a (R)AN 616 that operates in an NR or SG system, and the term "E-UTRAN" or the like may refer to a (R)AN 616 that operates in an LTE or 4G system. The UE 602 and UE 604 utilize connections (or channels) (shown as connection 606 and connection 608, respectively), each of which comprises a physical communications interface or layer (discussed in further detail below).

In this example, the connection 606 and connection 608 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 602 and UE 604 may directly exchange communication data via a ProSe interface 610. The ProSe interface 610 may alternatively be referred to as a sidelink (SL) interface 110 and may comprise one or more logical channels, including but not limited to a PSCCH, a PSSCH, a PSDCH, and a PSBCH.

The UE 604 is shown to be configured to access an AP 612 (also referred to as "WLAN node," "WLAN," "WLAN Termination," "WT" or the like) via connection 614. The connection 614 can comprise a local wireless connection, such as a connection consistent with any IEEE 802.11 protocol, wherein the AP 612 would comprise a wireless fidelity (Wi-Fi®) router. In this example, the AP 612 may be connected to the Internet without connecting to the core network of the wireless system (described in further detail below). In various embodiments, the UE 604, (R)AN 616, and AP 612 may be configured to utilize LWA operation and/or LWIP operation. The LWA operation may involve the UE 604 in RRC_CONNECTED being configured by the RAN node 618 or the RAN node 620 to utilize radio resources of LTE and WLAN. LWIP operation may involve the UE 604 using WLAN radio resources (e.g., connection 614) via IPsec protocol tunneling to authenticate and encrypt packets (e.g., IP packets) sent over the connection 614. IPsec tunneling may include encapsulating the entirety of original IP packets and adding a new packet header, thereby protecting the original header of the IP packets.

The (R)AN 616 can include one or more AN nodes, such as RAN node 618 and RAN node 620, that enable the connection 606 and connection 608. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 600 (e.g., an cNB). According to various embodiments, the RAN node 618 or RAN node 620 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 618 or RAN node 620 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 618 or RAN node 620); a MAC/PHY split wherein RRC, PDCP, RLC, and MAC layers are operated by the CRAN/vBBUP and the PHY layer is operated by individual RAN nodes (e.g., RAN node 618 or RAN node 620); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 618 or RAN node 620 to perform other virtualized applications. In some implementations, an individual RAN node may represent individual gNB-DUs that are connected to a gNB-CU via individual F1 interfaces (not shown by FIG. 6). In these implementations, the gNB-DUs may include one or more remote radio heads or RFEMs, and the gNB-CU may be operated by a server that is located in the (R)AN 616 (not shown) or by a server pool in a similar manner as the CRAN/vBBUP. Additionally, or alternatively, one or more of the RAN node 618 or RAN node 620 may be next generation eNBs (ng-eNBs), which are RAN nodes that provide E-UTRA user plane and control plane protocol terminations toward the UE 602 and UE 604, and are connected to an SGC via an NG interface (discussed infra). In V2X scenarios one or more of the RAN node 618 or RAN node 620 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 618 and/or the RAN node 620 can terminate the air interface protocol and can be the first point of contact for the UE 602 and UE 604. In some embodiments, the RAN node 618 and/or the RAN node 620 can fulfill various logical functions for the (R)AN 616 including, but not limited to, radio network controller (RNC) functions such as radio bearer management, uplink and downlink dynamic radio resource management and data packet scheduling, and mobility management.

In embodiments, the UE 602 and UE 604 can be configured to communicate using OFDM communication signals with each other or with the RAN node 618 and/or the RAN node 620 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 618 and/or the RAN node 620 to the UE 602 and UE 604, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 602 and UE 604 and the RAN node 618 and/or the RAN node 620 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHZ, whereas the unlicensed spectrum may include the 5 GHz band.

To operate in the unlicensed spectrum, the UE 602 and UE 604 and the RAN node 618 or RAN node 620 may operate using LAA, eLAA, and/or feLAA mechanisms. In these implementations, the UE 602 and UE 604 and the RAN node 618 or RAN node 620 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 602 and UE 604, RAN node 618 or RAN node 620, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 602, AP 612, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 602 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 602 and UE 604. The PDCCH carries information about the transport format and resource allocations related to the PDSCH channel, among other things. It may also inform the UE 602 and UE 604 about the transport format, resource allocation, and HARQ information related to the uplink shared channel. Typically, downlink scheduling (assigning control and shared channel resource blocks to the UE 604 within a cell) may be performed at any of the RAN node 618 or RAN node 620 based on channel quality information fed back from any of the UE 602 and UE 604. The downlink resource assignment information may be sent on the PDCCH used for (e.g., assigned to) each of the UE 602 and UE 604.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 618 or RAN node 620 may be configured to communicate with one another via interface 622. In embodiments where the system 600 is an LTE system (e.g., when CN 630 is an EPC), the interface 622 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 602 from an SeNB for user data; information of PDCP PDUs that were not delivered to a UE 602; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 600 is a SG or NR system (e.g., when CN 630 is an SGC), the interface 622 may be an Xn interface. The Xn interface is defined between two or more RAN nodes (e.g., two or more gNBs and the like) that connect to SGC, between a RAN node 618 (e.g., a gNB) connecting to SGC and an eNB, and/or between two cNBs connecting to 5GC (e.g., CN 630). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more RAN node 618 or RAN node 620. The mobility support may include context transfer from an old (source) serving RAN node 618 to new (target) serving RAN node 620; and control of user plane tunnels between old (source) serving RAN node 618 to new (target) serving RAN node 620. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 616 is shown to be communicatively coupled to a core network-in this embodiment, CN 630. The CN 630 may comprise one or more network elements 632, which are configured to offer various data and telecommunications services to customers/subscribers (e.g., users of UE 602 and UE 604) who are connected to the CN 630 via the (R)AN 616. The components of the CN 630 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 630 may be referred to as a network slice, and a logical instantiation of a portion of the CN 630 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 634 may be an element offering applications that use IP bearer resources with the core network (e.g., UMTS PS domain, LTE PS data services, etc.). The application server 634 can also be configured to support one or more communication services (e.g., VOIP sessions, PTT sessions, group communication sessions, social networking services, etc.) for the UE 602 and UE 604 via the EPC. The application server 634 may communicate with the CN 630 through an IP communications interface 636.

In embodiments, the CN 630 may be an SGC, and the (R)AN 116 may be connected with the CN 630 via an NG interface 624. In embodiments, the NG interface 624 may be split into two parts, an NG user plane (NG-U) interface 626, which carries traffic data between the RAN node 618 or RAN node 620 and a UPF, and the S1 control plane (NG-C) interface 628, which is a signaling interface between the RAN node 618 or RAN node 620 and AMFs.

In embodiments, the CN 630 may be a SG CN, while in other embodiments, the CN 630 may be an EPC). Where CN 630 is an EPC, the (R)AN 116 may be connected with the CN 630 via an S1 interface 624. In embodiments, the S1 interface 624 may be split into two parts, an S1 user plane (S1-U) interface 626, which carries traffic data between the RAN node 618 or RAN node 620 and the S-GW, and the S1-MME interface 628, which is a signaling interface between the RAN node 618 or RAN node 620 and MMEs.

Figure 7:
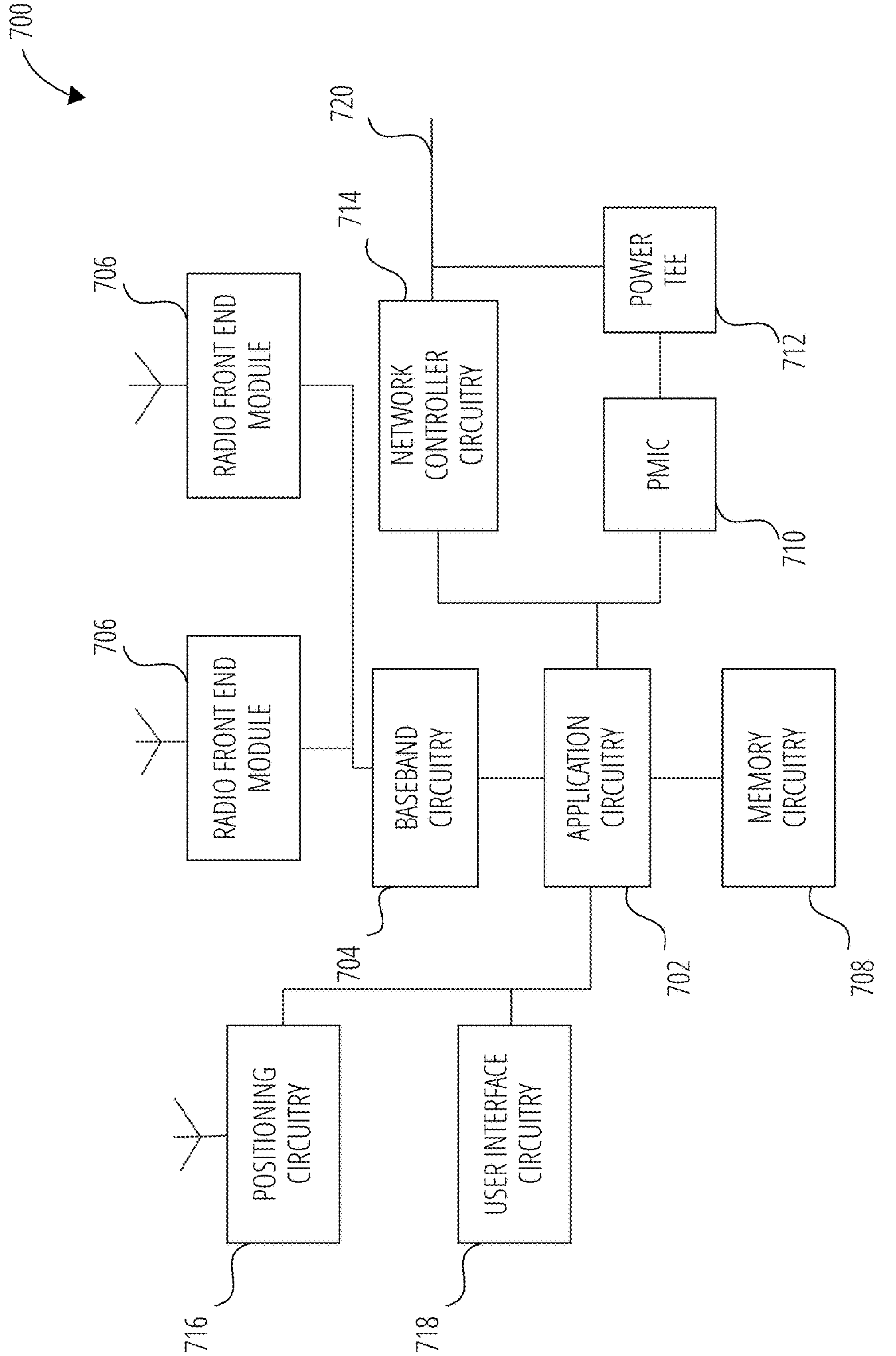
FIG. 7 illustrates an infrastructure equipment in accordance with one embodiment.

FIG. 7 illustrates an example of infrastructure equipment 700 in accordance with various embodiments. The infrastructure equipment 700 may be implemented as a base station, radio head, RAN node, AN, application server, and/or any other element/device discussed herein. In other examples, the infrastructure equipment 700 could be implemented in or by a UE.

The infrastructure equipment 700 includes application circuitry 702, baseband circuitry 704, one or more radio front end module 706 (RFEM), memory circuitry 708, power management integrated circuitry (shown as PMIC 710), power tee circuitry 712, network controller circuitry 714, network interface connector 720, satellite positioning circuitry 716, and user interface circuitry 718. In some embodiments, the device infrastructure equipment 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 702 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 702 may be coupled with or may include memory/storage elements and may be configured to execute instructions stored in the memory/storage to enable various applications or operating systems to run on the infrastructure equipment 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 702 may comprise, or may be, a special-purpose processor/controller to operate according to the various embodiments herein. As examples, the processor(s) of application circuitry 702 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the infrastructure equipment 700 may not utilize application circuitry 702, and instead may include a special-purpose processor/controller to process IP data received from an EPC or 5GC, for example.

In some implementations, the application circuitry 702 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 702 may comprise logic blocks or logic fabric, and other interconnected resources that may be programmed to perform various functions, such as the procedures, methods, functions, etc. of the various embodiments discussed herein. In such embodiments, the circuitry of application circuitry 702 may include memory cells (e.g., erasable programmable read-only memory (EPROM), electrically erasable programmable read-only memory (EEPROM), flash memory, static memory (e.g., static random access memory(SRAM), anti-fuses, etc.)) used to store logic blocks, logic fabric, data, etc. in look-up-tables (LUTs) and the like. The baseband circuitry 704 may be implemented, for example, as a solder-down substrate including one or more integrated circuits, a single packaged integrated circuit soldered to a main circuit board or a multi-chip module containing two or more integrated circuits.

The user interface circuitry 718 may include one or more user interfaces designed to enable user interaction with the infrastructure equipment 700 or peripheral component interfaces designed to enable peripheral component interaction with the infrastructure equipment 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and sub-mmWave.

The memory circuitry 708 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D)cross-point (XPOINT) memories from Intel® and Micron®. The memory circuitry 708 may be implemented as one or more of solder down packaged integrated circuits, socketed memory modules and plug-in memory cards.

The PMIC 710 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 712 provide for electrical power drawn from a network cable to provide both power supply and data connectivity to the infrastructure equipment 700 using a single cable.

The network controller circuitry 714 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 720 using a physical connection, which may be electrical (commonly referred to as a "copper interconnect"), optical, or wireless. The network controller circuitry 714 may include one or more dedicated processors and/or FPGAs to communicate using one or more of the aforementioned protocols. In some implementations, the network controller circuitry 714 may include multiple controllers to provide connectivity to other networks using the same or different protocols.

The positioning circuitry 716 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 716 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 716 may include a Micro-Technology for Positioning, Navigation, and Timing (Micro-PNT) IC that uses a master timing clock to perform position tracking/estimation without GNSS assistance. The positioning circuitry 716 may also be part of, or interact with, the baseband circuitry 704 and/or radio front end module 706 to communicate with the nodes and components of the positioning network. The positioning circuitry 716 may also provide position data and/or time data to the application circuitry 702, which may use the data to synchronize operations with various infrastructure, or the like. The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 8:
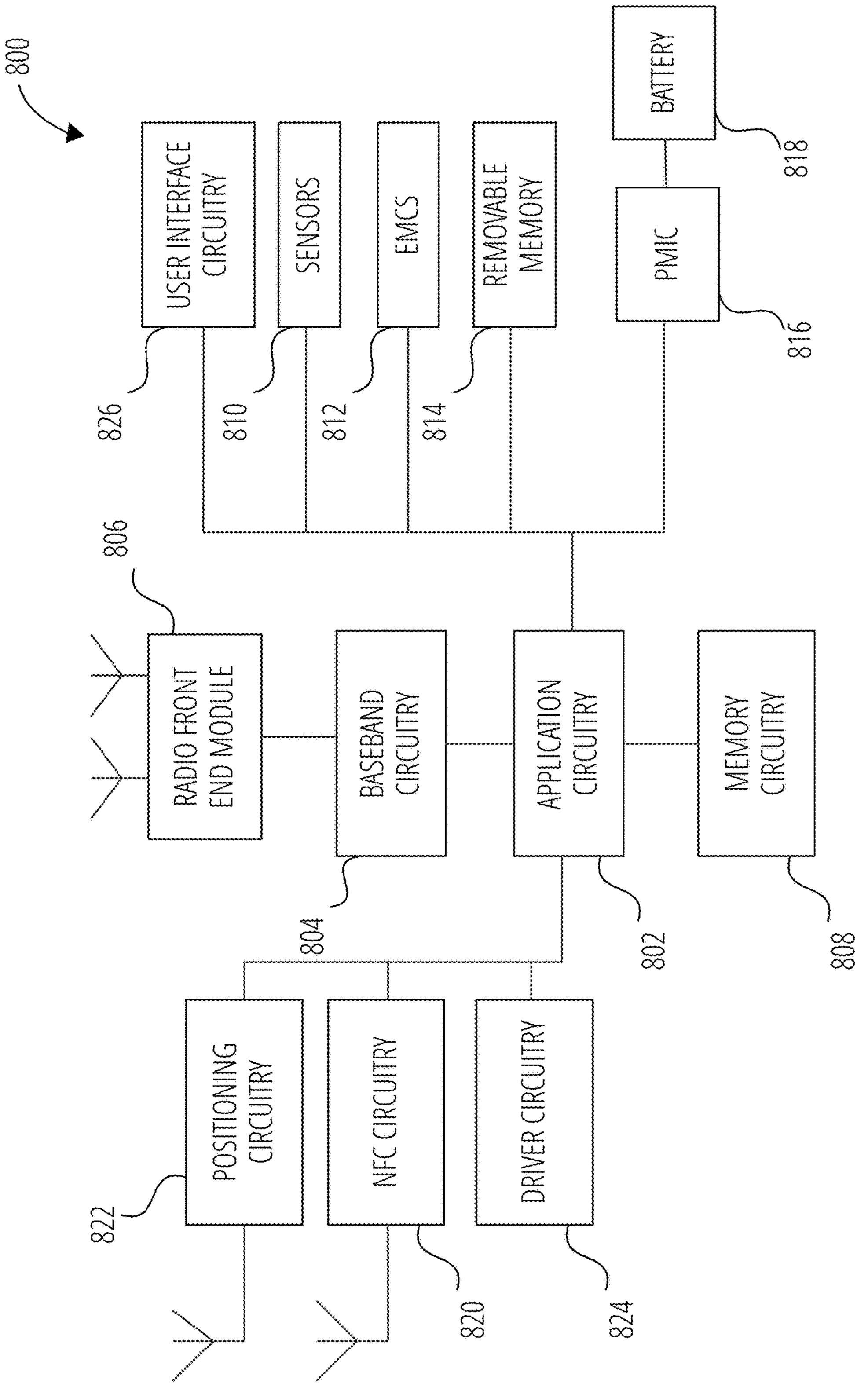
FIG. 8 illustrates a platform in accordance with one embodiment.

FIG. 8 illustrates an example of a platform 800 in accordance with various embodiments. In embodiments, the computer platform 800 may be suitable for use as UEs, application servers, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 802 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 802 may be coupled with or may include memory/storage elements and may be configured to execute instructions stored in the memory/storage to enable various applications or operating systems to run on the platform 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 802 may comprise, or may be, a special-purpose processor/controller to operate according to the various embodiments herein.

As examples, the processor(s) of application circuitry 802 may include an Intel® Architecture Core™ based processor, such as a Quark™, an Atom™, an i3, an i5, an i7, or an MCU-class processor, or another such processor available from Intel® Corporation. The processors of the application circuitry 802 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 802 may be a part of a system on a chip (SoC) in which the application circuitry 802 and other components are formed into a single integrated circuit, or a single package, such as the Edison™ or Galileo™ SoC boards from Intel® Corporation.

Additionally or alternatively, application circuitry 802 may include circuitry such as, but not limited to, one or more a field-programmable devices (FPDs) such as FPGAs and the like; programmable logic devices(PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., crasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 804 may be implemented, for example, as a solder-down substrate including one or more integrated circuits, a single packaged integrated circuit soldered to a main circuit board or a multi-chip module containing two or more integrated circuits.

The radio front end module 806 may comprise a millimeter wave (mmWave) radio front end module (RFEM) and one or more sub-mmWave radio frequency integrated circuits (RFICs). In some implementations, the one or more sub-mm Wave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mm Wave antennas and sub-mmWave.

The memory circuitry 808 may include any number and type of memory devices used to provide for a given amount of system memory. As examples, the memory circuitry 808 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 808 may be developed in accordance with a Joint Electron Devices Engineering Council (JEDEC) low power double data rate (LPDDR)-based design, such as LPDDR2, LPDDR3, LPDDR4, or the like. Memory circuitry 808 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 808 maybe on-die memory or registers associated with the application circuitry 802. To provide for persistent storage of information such as data, applications, operating systems and so forth, memory circuitry 808 may include one or more mass storage devices, which may include, inter alia, a solid state disk drive (SSDD), hard disk drive(HDD), a microHDD, resistance change memories, phase change memories, holographic memories, or chemical memories, among others. For example, the computer platform 800 may incorporate the three-dimensional (3D) cross-point (XPOINT) memories from Intel® and Micron®.

The removable memory 814 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensors 810 and electro-mechanical components (shown as EMCs 812), as well as removable memory devices coupled to removable memory 814.

The sensors 810 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 812 include devices, modules, or subsystems whose purpose is to enable platform 800 to change its state, position, and/or orientation, or move or control a mechanism or (sub)system. Additionally, EMCs 812 may be configured to generate and send messages/signaling to other components of the platform 800 to indicate a current state of the EMCs 812. Examples of the EMCs 812 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 812 based on one or more captured events and/or instructions or control signals received from a service provider and/or various clients. In some implementations, the interface circuitry may connect the platform 800 with positioning circuitry 822. The positioning circuitry 822 includes circuitry to receive and decode signals transmitted/broadcasted by a positioning network of a GNSS. Examples of navigation satellite constellations (or GNSS)include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 822 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 822 may include a Micro-PNT IC that uses a master timing clock to perform position tracking/estimation without GNSS assistance. The positioning circuitry 822 may also be part of, or interact with, the baseband circuitry 804 and/or radio front end module 806 to communicate with the nodes and components of the positioning network. The positioning circuitry 822 may also provide position data and/or time data to the application circuitry 802, which may use the data to synchronize operations with various infrastructure (e.g., radio base stations), for turn-by-turn navigation applications, or the like.

In some implementations, the interface circuitry may connect the platform 800 with Near-Field Communication circuitry (shown as NFC circuitry 820). The NFC circuitry 820 is configured to provide contactless, short-range communications based on radio frequency identification (RFID) standards, wherein magnetic field induction is used to enable communication between NFC circuitry 820 and NFC-enabled devices external to the platform 800 (e.g., an "NFC touchpoint"). NFC circuitry 820 comprises an NFC controller coupled with an antenna element and a processor coupled with the NFC controller. The NFC controller may be a chip/IC providing NFC functionalities to the NFC circuitry 820 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 820, or initiate data transfer between the NFC circuitry 820 and another active NFC device (e.g., a smartphone or an NFC-enabled POS terminal) that is proximate to the platform 800.

The driver circuitry 824 may include software and hardware elements that operate to control particular devices that are embedded in the platform 800, attached to the platform 800, or otherwise communicatively coupled with the platform 800. The driver circuitry 824 may include individual drivers allowing other components of the platform 800 to interact with or control various input/output (I/O) devices that may be present within, or connected to, the platform 800. For example, driver circuitry 824 may include a display driver to control and allow access to a display device, a touchscreen driver to control and allow access to a touchscreen interface of the platform 800, sensor drivers to obtain sensor readings of sensors 810 and control and allow access to sensors 810, EMC drivers to obtain actuator positions of the EMCs 812 and/or control and allow access to the EMCs 812, a camera driver to control and allow access to an embedded image capture device, audio drivers to control and allow access to one or more audio devices.

The power management integrated circuitry (shown as PMIC 816) (also referred to as "power management circuitry") may manage power provided to various components of the platform 800. In particular, with respect to the baseband circuitry 804, the PMIC 816 may control power-source selection, voltage scaling, battery charging, or DC-to-DC conversion. The PMIC 816 may often be included when the platform 800 is capable of being powered by a battery 818, for example, when the device is included in a UE.

In some embodiments, the PMIC 816 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 818 may power the platform 800, although in some examples the platform 800 may be mounted deployed in a fixed location, and may have a power supply coupled to an electrical grid. The battery 818 may be a lithium ion battery, a metal-air battery, such as a zinc-air battery, an aluminum-air battery, a lithium-air battery, and the like. In some implementations, such as in V2X applications, the battery 818 may be a typical lead-acid automotive battery.

In some implementations, the battery 818 may be a "smart battery," which includes or is coupled with a Battery Management System (BMS) or battery monitoring integrated circuitry. The BMS may be included in the platform 800 to track the state of charge (SoCh) of the battery 818. The BMS may be used to monitor other parameters of the battery 818 to provide failure predictions, such as the state of health (SoH) and the state of function (SoF) of the battery 818. The BMS may communicate the information of the battery 818 to the application circuitry 802 or other components of the platform 800. The BMS may also include an analog-to-digital (ADC) convertor that allows the application circuitry 802 to directly monitor the voltage of the battery 818 or the current flow from the battery 818. The battery parameters may be used to determine actions that the platform 800 may perform, such as transmission frequency, network operation, sensing frequency, and the like.

A power block, or other power supply coupled to an electrical grid may be coupled with the BMS to charge the battery 818. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 818, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 826 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 826 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensors 810 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 9:
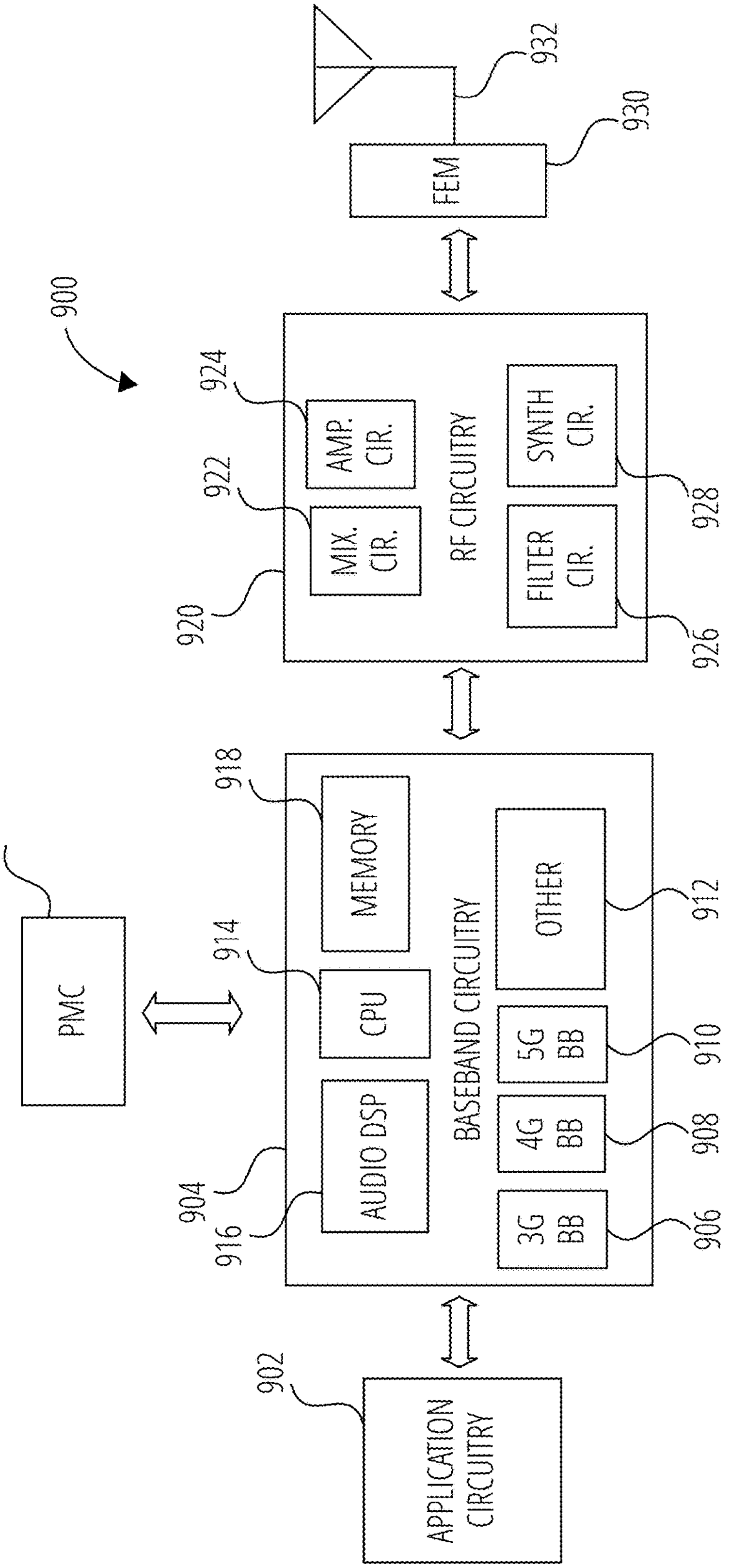
FIG. 9 illustrates a device in accordance with one embodiment.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing Unit (CPU 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
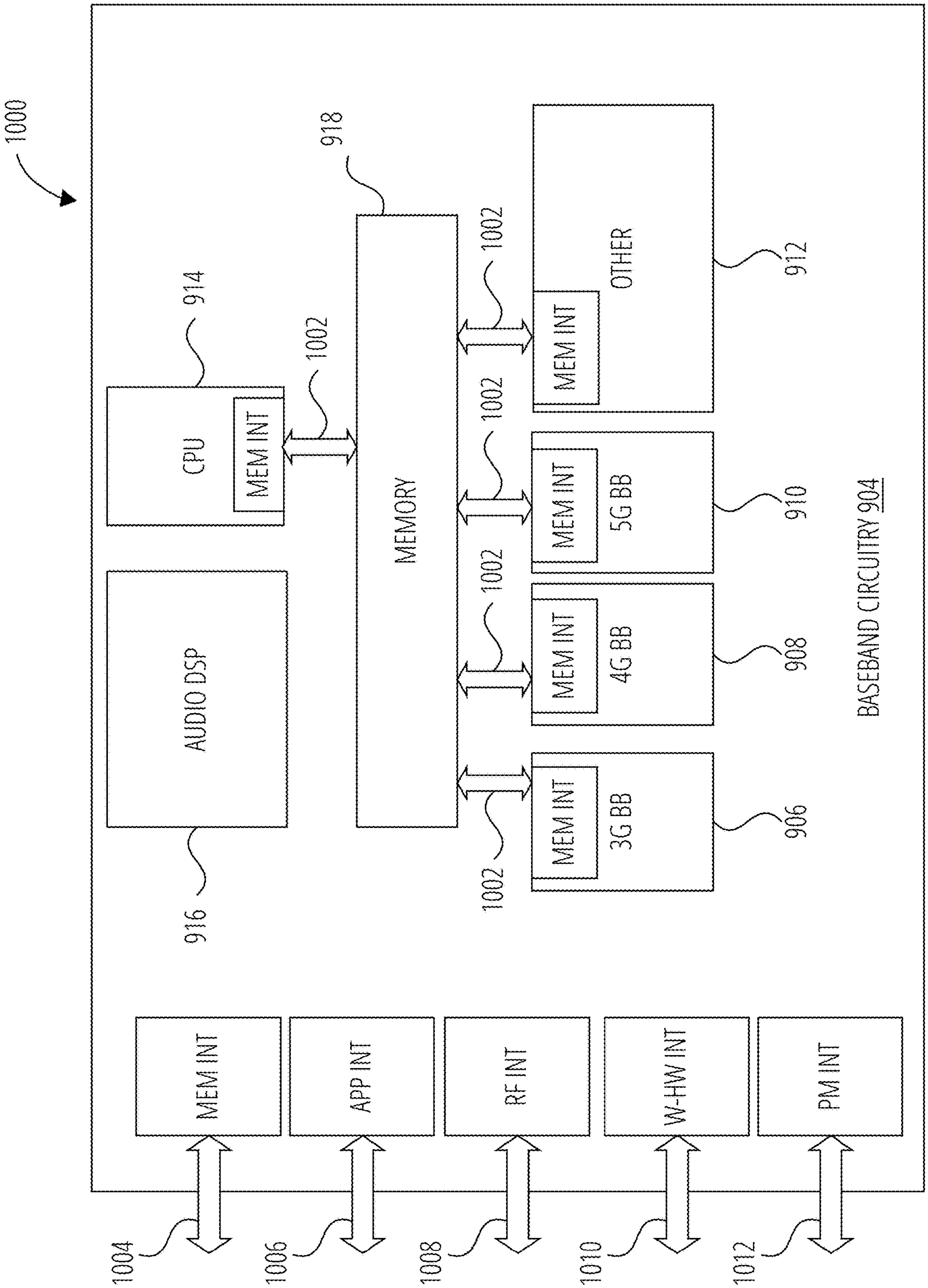
FIG. 10 illustrates example interfaces in accordance with one embodiment.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
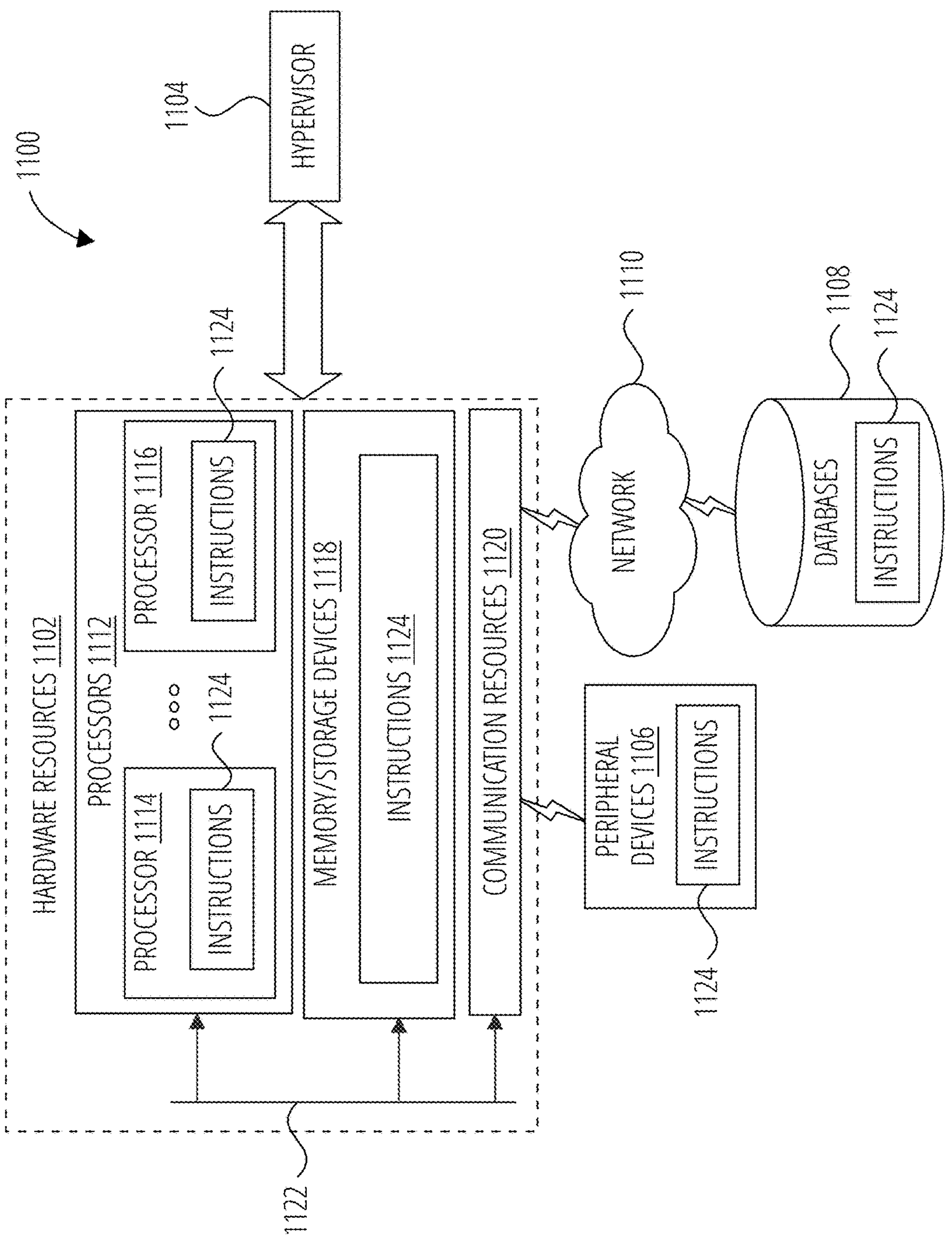
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1a may include a method of determining user equipment (UE) positioning within a 5G New Radio (NR) network, the method comprising: receiving a downlink (DL) position reference signal (PRS) resource set indicating a plurality of DL PRS resources; receiving a DL PRS report configuration that indicates a set of measurements to be performed by a UE for each of the plurality of DL PRS resources within the DL PRS resource set; performing position measurements for each of the plurality of DL PRS resources within the DL PRS resource set, wherein performing position measurements includes: generating a reference signal time difference (RSTD) measurement by estimating a timing of a first arrival path from at least two of the plurality of DL PRS resources; and determining a reference signal received power (RSRP) metric or a signal to noise and interference ratio (SINR) metric associated with the at least two DL PRS resources, wherein the RSTD measurement is weighted based on the determined RSRP metric or SINR metric associated with the at least two DL PRS resources; and reporting the performed position measurements.

Example 2a may include the method of example 1a wherein the UE reports multiple measurements for each DL PRS resource set.

Example 3a may include the method of example 1a, wherein the UE reports a single measurement for each DL PRS resource set.

Example 4a may include the method of example 1a, wherein performing position measurements further includes generating a ranging round trip time (RTT) estimation for a plurality of cells of the 5G NR network.

Example 5a may include the method of example 4a, wherein generating the ranging RTT estimation is performed with respect to a serving cell and includes RSTD measurements for neighboring cells relative to the serving cell.

Example 6a may include the method of example 4a wherein the received DL PRS report configuration is aligned with one or more positioning capabilities of the UE.

Example 7a may include the method of example 1a, wherein DL PRS resource allocation is cell-centric such that each UE attempting to provide position services within the 5G NR is supported.

Example 8a may include an apparatus of a user equipment (UE), comprising: one or more processors configured to: receive a downlink (DL) position reference signal (PRS) resource set indicating a plurality of DL PRS resources; receive a DL PRS report configuration that indicates a set of measurements to be performed by a UE for each of the plurality of DL PRS resources within the DL PRS resource set; perform position measurements for each of the plurality of DL PRS resources within the DL PRS resource set, wherein performing position measurements includes: generating a reference signal time difference (RSTD) measurement by estimating timing of a first arrival path from at least two of the plurality of DL PRS resources; and determining a reference signal received power (RSRP) metric or a signal to noise and interference ratio (SINR) metric associated with the at least two DL PRS resources, wherein the RSTD measurement is weighted based on the determined RSRP metric or SINR metric associated with the at least two DL PRS resources; and report the performed position measurements; and memory configured to store the DL PRS report configuration.

Example 9a may include the apparatus of example 8a, wherein the UE reports multiple measurements for each DL PRS resource set.

Example 10a may include the apparatus of example 8a, wherein the UE reports a single measurement for each DL PRS resource set.

Example 11a may include the apparatus of example 8a, wherein performing position measurements further includes generating a ranging round trip time (RTT) estimation for a plurality of cells of the 5G NR network.

Example 12a may include the apparatus of example 11a, wherein generating the ranging RTT estimation is performed with respect to a serving cell and includes RSTD measurements for neighboring cells relative to the serving cell.

Example 13a may include the apparatus of example 11a, wherein the received DL PRS report configuration is aligned with one or more positioning capabilities of the UE.

Example 14a may include the apparatus of example 8a, wherein DL PRS resource allocation is cell-centric such that each UE attempting to provide position services within the 5G NR is supported.

Example 15a may include an apparatus of a user equipment (UE) within a 5G New Radio (NR) network, comprising: one or more processors configured to: provide UE positioning configuration information to a node of the 5G NR network; receive a downlink (DL) position reference signal (PRS) resource set indicating a plurality of DL PRS resources; receive a DL PRS report configuration that indicates a set of measurements to be performed by a UE for each of the plurality of DL PRS resources within the DL PRS resource set; perform position measurements for each of the plurality of DL PRS resources within the DL PRS resource set, wherein performing position measurements includes: generating a ranging round trip time (RTT) estimation associated with a serving cell of the 5G NR network; and generating a reference signal time difference (RSTD) measurement associated with a plurality of neighboring cells relative to the serving cell; and report the performed position measurements; and memory configured to store the DL PRS report configuration.

Example 16a may include the apparatus of example 15a, wherein the DL PRS resource is configured specifically for the UE based on the UE positioning configuration information provided to the node of the 5G NR network.

Example 17a may include the apparatus of example 15a wherein the performing position measurements further includes generating a reference signal time difference (RSTD) measurement by estimating timing of a first arrival path from at least two of the plurality of DL PRS resources.

Example 18a may include the apparatus of example 17a, wherein the performing position measurements further includes determining a reference signal received power (RSRP) metric or a signal to noise and interference ratio (SINR) metric associated with the at least two DL PRS resources, wherein the RSTD measurement is weighted based on the determined RSRP metric or SINR metric associated with the at least two DL PRS resources.

Example 19a may include the apparatus of example 18a, wherein the RSRP measurement is performed with respect to all multi-path components.

Example 20a may include the apparatus of example 18a, wherein the RSRP measurement is performed for a first arrival path component.

Example 1b may include the method of NR Positioning, wherein positioning operation comprises: NR DL PRS Resource configuration procedure; NR UL PRS Resource configuration procedure; NR DL PRS transmission procedure; NR UL PRS transmission procedure; Positioning parameters measurement based on NR DL PRS; Positioning parameters measurement based on NR UL PRS; Signaling of measured positioning parameters.

Example 2b may include the method of example 1b or some other example herein, wherein DL PRS Resource configuration procedure comprises: DL PRS Resource Pool configuration; DL PRS Resource Set configuration.

Example 3b may include the method of example 2b or some other example herein, wherein DL PRS Resource set contains a set of unique DL PRS Resources Example 4b may include the method of example 2b or some other example herein, wherein measurement of positioning parameter comprises: single measurement value; set of multiple measurement values.

Example 5b may include the method of example 4b or some other example herein, wherein the single measurement report comprises one or a combination of the following methods: reporting of measurement which is indicated higher layer signaling from network side, for example the unique DL PRS Resource Id can be signalized for measurement report; selection rule is used on a UE side in order to determine the positioning measurement for reporting; reported positioning measurement is a derivative function of positioning measurements obtained from DL PRS Resources from DL PRS Resource Set, as an example, following formula can be used for propagation delay measurement selection: Propagation delay measurement=min {propagation delay measurement from all DL PRS Resource inside Resource Set}.

Example 6b may include the method of example 5b or some other example herein, wherein selection rule for single positioning measurement dedicated to report comprises one or a combination of the following methods: positioning measurement selection with best PRS SNR/RSRP/RSRQ value; positioning measurement selection with best estimation accuracy; positioning measurement selection with best soft LOS metric.

Example 7b may include the method of example 4b or some other example herein, wherein the set of multiple measurement report comprises one or a combination of the following methods: positioning measurement set for predefined by the higher layers set of DL PRS Resource Ids; positioning measurement set for selected by UE set of DL PRS Resource Ids; positioning measurement set which is created according to a selection rule.

Example 8b may include the method of example 7b or some other example herein, wherein a selection rule of multiple positioning measurements comprises one or a combination of the following methods: selection rule of measurement with PRS SNR/RSRP/RSRQ value above predefined threshold; selection rule of measurement with the soft LOS metric value above predefined threshold.

Example 9b may include the method of example 8b or some other example herein, wherein threshold value is defined by the higher layers.

Example 10b may include the method of example 1b or some other example herein, wherein the positioning procedure can be applied UE side.

Example 11b may include the method of example 10b or some other example herein, wherein the UE based positioning comprises one of following options: network assisted UE based positioning; autonomous UE based positioning.

Example 12b may include the method of example 11b or some other example herein, wherein network assisted UE-based positioning supports signaling of UEs calculated coordinate to the network in order to have the possibility of using current coordinate for DL PRS Resources configuration.

Example 13b may include the method of example 1b or some other example herein, wherein positioning parameters measurement based on NR DL PRS, propagation delay measurements like Reference Signal Time Difference (RSTD) is estimated between DL PRS Resource of interest and the reference DL PRS Resource.

Example 14b may include the method of example 13b or some other example herein, wherein the reference DL PRS resource selection comprises one or a combination of following methods: reference DL PRS resource Id is provided by network using higher layer signaling (e.g., as a part of DL PRS Report configuration); if reference DL PRS resource ID is not provided by network, it is selected by UE and indicated to network as a part of UE reporting.

Example 15b may include the method of example 13b or some other example herein, wherein RSTD measurement is obtained on a UE side, the DL PRS RSRP measurement is calculated, which is defined as one of the following options: RSRP from all multi-path components (RSRP); RSRP of the first arrival path component (RSRPFAP).

Example 16b may include the method of example 15b or some other example herein, wherein DL PRS RSRP is measured, the soft LOS metric is defined as one or a combination of the following methods: ratio of RSRP of first detected components in the estimated to the total power of all detected channel components: $RSRP_{FAP}/RSRP$; ratio of RSRP of first detected components in the estimated to the sum power of other detected channel components ($RSRP_{FAP}/(RSRP-RSRP_{FAP})$).

Example 17b may include the method of example 16b or some other example herein, wherein soft LOS metric is calculated, the measured soft LOS metric is included into the positioning measurement report.

Example 18b may include the method of example 1b or some other example herein, wherein positioning parameters measurement based on NR DL PRS, RTT procedure is applied by providing of RSTD measurement on a UE side using NR DL PRS from particular gNB and reference gNB RSTD measurement on a gNB side using NR UL PRS from particular UE and reference gNB, wherein the following two options of the RTT procedure may be utilized: ranging (RTT estimation) with serving (or reference) cell/TRP assuming RSTD measurements for neighboring cells/TRPs relative to serving (or reference) cell/TRP; ranging (RTT estimation) with multiple cells/TRPs.

Example 19b may include the method of example 18b or some other example herein, wherein the RTT measurement procedure is applied, for time instance measurement are estimated by the node 1 and node 2 that are involved into RTT operation: $t_1$—time instance of initial PRS1 transmission on a node 1; $t_2$—time instance of PRS1 reception on a node 2; $t_3$—time instance of PRS2 transmission on a node 2; $t_4$—time instance of PRS1 reception on a node 1.

Example 20b may include the method of example 18b or some other example herein, wherein RTT measurement is done only with serving (reference) cell/TRP, the synchronization error between serving(reference) cell/TRP and other neighboring cells/TRPs is reported to a UE side or used on the network side in order to improve RSTD measurement accuracy.

Example 21b may include the method of example 18b or some other example herein, wherein RTT measurement is done multiple cells/TRPs, the synchronization error between serving(reference) cell/TRP and other neighboring cells/TRPs is measured by a UE, as an example, the following formula can be used for calculation of synchronization error between serving(reference) cell/TRP and other neighboring cells/TRPs:

$t_1$ - UL Transmission Timing
$t_2$ - UL Reception Timing on TRP1/gNB1
$y_2$ - UL Reception Timing on TRP2/gNB2

-continued

| | |
|---|---|
| $t_3$ - DL Transmission Timing on TRP1/gNB1 | |
| $y_3$ - DL Transmission Timing on TRP2/gNB2 | |
| $t_4$ - DL Reception Timing from TRP1/gNB1 | $RTT_1 = [(t_4 - t_1) - (t_3 - t_2)]$ |
| $y_4$ - DL Reception Timing from TRP2/gNB2 | $RTT_2 = [(y_4 - t_1) - (y_3 - y_2)]$ |
| Timing offset b/w TRP1/gNB1 and TRP2/gNB2 | |
| $\Delta_{TRP} = y_3 - t_3 = (RTT_2/2 + (y_3 - y_2)) - (RTT_1/2 + (t_3 - t_2)) = (y_4 - RTT_2/2) - (t_4 - RTT_1/2)$ | |

Example 22b may include the method of example 21b or some other example herein, wherein synchronization error between serving(reference) cell/TRP and other neighboring cells/TRPs is estimated on a UE side, time instances $t_1$ and $t_2$ that are measured on each gNB side are signaled to a UE.

Example 23b may include the method of example 18b or some other example herein, wherein RTT procedure is applied, the synchronization time error between a UE and a cell/TRP is measured by a UE, as an example, following formula can be used for calculation of synchronization time error between a UE and a cell/TRP:

| | |
|---|---|
| $t_1$ - UL Transmission Timing | |
| $t_2$ - UL Reception Timing on TRP1/gNB1 | |
| $y_2$ - UL Reception Timing on TRP2/gNB2 | |
| $t_3$ - DL Transmission Timing on TRP1/gNB1 | Timing offset b/w UE and TRP1/gNB1 |
| $y_3$ - DL Transmission Timing on TRP2/gNB2 | $\Delta_1 = [(t_2 - t_1) - (t_4 - t_3)]/2$ |
| $t_4$ - DL Reception Timing from TRP1/gNB1 | Timing offset b/w UE and TRP2/gNB2 |
| $y_4$ - DL Reception Timing from TRP2/gNB2 | $\Delta_2 = [(y_2 - t_1) - (y_4 - y_3)]/2$ |

Example 24b may include the method of example 23b or some other example herein, wherein synchronization time error between a UE and a cell/TRP is measured, time instances t1 and t2 that are measured on each gNB side are signaled to a UE.

Example 25b may include the method of example 23b or some other example herein, wherein synchronization time error between a UE and a cell/TRP is measured, the quasi-synchronous operation work is defined, which comprises: defined a quasi-synchronous period of time TQS during which the sampling clocks on a UE and a cell/TRP have constant synchronization error; consecutive period of time TQS_RTT dedicated for RTT operation procedure between UE(s) and a cell/TRP(s); consecutive period of time TQS_TOA=TQS-TQS_RTT dedicated for TOA measurement operation between UE(s) and a cell/TRP(s).

Example 26b may include the method of example 25b or some other example herein, wherein synchronization time error between a UE and a cell/TRP is measured, the time period of quasi-synchronization TQS is defined as: preconfigured value in the system; value which depends on cell/TRP and UE sampling clock synchronization capabilities.

Example 27b may include the method of example 25b or some other example herein, wherein synchronization time error between a UE and a cell/TRP is measured, the time period TQS_RTT is defined as: preconfigured value in the system; value which depends on cell/TRP and UE sampling clock synchronization capabilities.

Example 28b may include the method of example 25b or some other example herein, wherein synchronization time error between a UE and a cell/TRP is measured, it is defined the TO measurement operation during the TQS_TOA time period. TOA measurement can be reported in the fields of RSTD measurement report structure, assuming that there is no reference cell/TRP.

Example 29b may include the method of example 16b or some other example herein, wherein the soft LOS metric is defined, the estimation of DL AoD is calculated based on the DL PRS resource Id information with the heist soft LOS metric.

Example 30b may include the method of example 1b or some other example herein, wherein positioning measurements are obtained based on NR DL PRS, the UE signalizes it's positioning reception capabilities.

Example 31b may include the method of example 30b or some other example herein, wherein the UEs positioning capability is signaled to the network, one or a combination of the following mechanisms can be used for signaling: UE signalizes its positioning capability type Id, assuming that fixed UE type set with different positioning capabilities is predefined in the network; UE signalizes positioning capability in terms of DL PRS resources which it is capable to proceeded, assuming that positioning BWP in the system is known on a UE side; UE signalizes positioning capability by maximum number of DL PRS resource which is capable to be proceeded, assuming predefined positioning BWP configuration; UE signalizes the number of supported DL PRS Resources as a function of DL PRS resource bandwidth.

Example 32b may include the method of example 1b or some other example herein, wherein positioning measurements are obtained based on NR UL PRS. The following two types of gNB reporting may be considered: gNB shares measurements to network (LMF/location server); gNB shares measurements results to UEs (either directly or through LMF/location server).

Example 33b may include the method of example 1b or some other example herein, wherein NR DL PRS Resource configuration procedure is defined. The following types of NR DL PRS allocation may be used: cell-centric DL PRS resource allocation, which may not be optimized for any UE in the network; UE Centric DL PRS Resource Allocation, which is based on UE feedback, to network based on processing of Cell-Centric DL PRS Resources or Rel-15 legacy signals such as SSB or CSI-RS for BM. A method of example 33, wherein UE Centric DL PRS Resource Allocation is defined, one or a combination of the following parameters from UE feedback may be used for NR DL PRS resource allocation: Cell ID; SSB index (e.g., corresponding to max SS-RSRP value); CSI-RS Resource ID (e.g. corresponding to max L1-RSRP value); UE location information (e.g., if UE has a-priori knowledge of it coordinates); UE TX-RX Measurement based on Rel.15 reference signals; Recommended DL PRS Resources (Resource IDs) based on processing of Cell Centric DL PRS Resources.

Example 34b may include the method of example 1b or some other example herein, wherein positioning measurements are obtained based on NR DL PRS and NR UL PRS, in case if UE supports beam correspondence, it applies RX beam for UL transmission of NR UL PRS Example 35b may include the method of example 1b or some other example herein, wherein NR UL PRS transmission procedure is applied, the UL TA selection corresponds to one or a combination of following options: UE applies the same timing advance for all UL SRS (PRS) resources across all UL SRS(PRS) resource sets as for serving cell (reference); UE applies the timing advance corresponding to one of the neighboring cells for all UL SRS (PRS) resources across all UL SRS (PRS) resource sets; UE applies individual timing advance for all UL SRS (PRS) resources across all UL SRS (PRS) resource sets; UE applies common timing offset for transmission on all UL SRS (PRS) resources across all UL SRS (PRS) resource sets. The value of common timing offset is indicated by gNB independently of timing advance. The common timing offset is defined either with respect to DL reception timing or DL reception timing and timing advance.

Example 36b may include the method of example 1b or some other example herein, wherein NR UL PRS transmission procedure is applied, the power control procedure corresponds to one or a combination of the following options: UL SRS power control behavior is reused for NR positioning; UL SRS resource set refers to DL RS resource (e.g., DL PRS, CSI-RS) in neighboring cell for pathloss estimation; UL SRS resource set is configured with pathloss value to be used for open loop power control.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method of a base station comprising:

transmitting, to a user equipment (UE), a downlink (DL) position reference signal (PRS) resource set indicating a plurality of DL PRS resources;

transmitting, to the UE, a DL PRS report configuration that indicates a set of measurements to be performed by the UE for each of the plurality of DL PRS resources within the DL PRS resource set; and receiving, from the UE, position measurements for each of the plurality of DL PRS resources within the DL PRS resource set.

2. The method of claim 1, wherein the position measurements comprise a reference signal time difference (RSTD) measurement.

3. The method of claim 2, wherein the RSTD measurement is weighted based on one of an RSRP metric and an SINR metric that is associated with at least two of the plurality of DL PRS resources.

4. The method of claim 1, wherein DL PRS resource allocation is cell-centric such that each UE attempting to provide position services is supported.

5. The method of claim 1, further comprising selecting the DL PRS resource set based on assistance information received from the UE.

6. The method of claim 5, wherein the information received from the UE comprises one or more of a cell identifier (ID), a synchronization signal block (SSB) index, a channel state information-reference signal (CSI-RS) resource ID, UE location information, UE transmit-receive (Tx-Rx) measurements performed on reference signals, and recommended DL PRS resources.

7. The method of claim 1, further comprising transmitting, to the UE, the plurality of DL PRS resources using transmit (Tx) beam sweeping.

8. An apparatus of a base station, comprising:

one or more processors configured to cause the base station to:

transmit, to a user equipment (UE), a downlink (DL) position reference signal (PRS) resource set indicating a plurality of DL PRS resources;

transmit, to the UE, a DL PRS report configuration that indicates a set of measurements to be performed by the UE for each of the plurality of DL PRS resources within the DL PRS resource set; and receive, from the UE, position measurements for each of the plurality of DL PRS resources within the DL PRS resource set; and memory configured to store the DL PRS report configuration.

9. The apparatus of claim 8, wherein the position measurements comprise a reference signal time difference (RSTD) measurement.

10. The apparatus of claim 9, wherein the RSTD measurement is weighted based on one of an RSRP metric and an SINR metric that is associated with at least two of the plurality of DL PRS resources.

11. The apparatus of claim 8, wherein DL PRS resource allocation is cell-centric such that each UE attempting to provide position services is supported.

12. The apparatus of claim 8, wherein the one or more processors are further configured to cause the base station to select the DL PRS resource set based on assistance information received from the UE.

13. The apparatus of claim 12, wherein the assistance information received from the UE comprises one or more of a cell identifier (ID), a synchronization signal block (SSB) index, a channel state information-reference signal (CSI-RS) resource ID, UE location information, UE transmit-receive (Tx-Rx) measurements performed on reference signals, and recommended DL PRS resources.

14. The apparatus of claim 8, wherein the one or more processors are further configured to cause the base station to transmit, to the UE, the plurality of DL PRS resources using transmit (Tx) beam sweeping.

15. A non-transitory computer readable storage medium having instructions that, when executed by one or more processors of a base station, cause the base station to:

receive, from a user equipment (UE), UE positioning configuration information;

transmit, to the UE, a downlink (DL) position reference signal (PRS) resource set indicating a plurality of DL PRS resources;

transmit, to the UE, a DL PRS report configuration that indicates a set of measurements to be performed by the UE for each of the plurality of DL PRS resources within the DL PRS resource set; and receive, from the UE, position measurements for each of the plurality of DL PRS resources within the DL PRS resource set.

16. The non-transitory computer readable storage medium of claim 15, wherein the DL PRS resource set is configured specifically for the UE based on the UE positioning configuration information provided to the base station.

17. The non-transitory computer readable storage medium of claim 15, wherein the position measurements comprise a reference signal time difference (RSTD) measurement.

18. The non-transitory computer readable storage medium of claim 17, wherein the RSTD measurement is weighted based on one of an RSRP metric and an SINR metric that is associated with at least two of the plurality of DL PRS resources.

19. The non-transitory computer readable storage medium of claim 15, wherein the instructions, when executed by one or more processors, further cause the base station to select the DL PRS resource set based on information received from the UE.

20. The non-transitory computer readable storage medium of claim 15, wherein the instructions, when executed by one or more processors, further cause the base station to transmit, to the UE, the plurality of DL PRS resources using transmit (Tx) beam sweeping.

* * * * *